US010789578B2

United States Patent
Kitano et al.

(10) Patent No.: US 10,789,578 B2
(45) Date of Patent: Sep. 29, 2020

(54) NETWORK SYSTEM, AND SERVER APPARATUS, SERVER APPARATUS CONTROL METHOD, AND COMPUTER READABLE STORAGE MEDIUM FOR USE IN SAME

(71) Applicant: KONAMI DIGITAL ENTERTAINMENT CO., LTD., Tokyo (JP)

(72) Inventors: Toyofumi Kitano, Tokyo (JP); Satoshi Ueda, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 826 days.

(21) Appl. No.: 15/007,049

(22) Filed: Jan. 26, 2016

(65) Prior Publication Data
US 2016/0140517 A1    May 19, 2016

Related U.S. Application Data

(63) Continuation of application No. PCT/JP2014/070379, filed on Aug. 1, 2014.

(30) Foreign Application Priority Data

Aug. 2, 2013   (JP) .................. 2013-161710

(51) Int. Cl.
*G06Q 20/06*   (2012.01)
*G07F 17/32*   (2006.01)

(52) U.S. Cl.
CPC ..... *G06Q 20/0655* (2013.01); *G07F 17/3251* (2013.01)

(58) Field of Classification Search
CPC ............ G07F 17/3244; G07F 17/3251; G06Q 20/065; G06Q 20/102; G06Q 20/38;
(Continued)

(56) References Cited

U.S. PATENT DOCUMENTS

| | | | |
|---|---|---|---|
| 7,590,602 B1 * | 9/2009 | Luzzatto | G06Q 20/02 705/64 |
| 2007/0150413 A1 * | 6/2007 | Morgenstern | G06Q 20/10 705/39 |

(Continued)

FOREIGN PATENT DOCUMENTS

| | | |
|---|---|---|
| CN | 1815513 A | 8/2006 |
| JP | 4955729 B2 | 3/2012 |

OTHER PUBLICATIONS

The First Office Action (CN Patent Application No. 201480040684.6); dated Dec. 4, 2018; 9 pages.

(Continued)

*Primary Examiner* — Elda G Milef
(74) *Attorney, Agent, or Firm* — Howard & Howard Attorneys PLLC

(57) ABSTRACT

In a network system where a balance of virtual currency is recorded in data D41 of balance information in association with a user ID unique for each user, the user ID being associated with personal information of the user; and addition or subtraction is performed with respect to the amount of virtual currency in response to a purchase requirement or a consumption requirement designating the user ID or a card ID linked with the user ID, in a case where use of virtual currency is required with designating the card ID, it is determined whether the user ID linked with the card ID exists (S103), and when it is determined the user ID linked with the card ID does not exist, a user ID which is not (Continued)

associated is generated (S131), and the provisional user ID and the card ID are linked with each other (S132).

18 Claims, 13 Drawing Sheets

(58) Field of Classification Search
 CPC .. G06Q 20/0658; G06Q 20/204; G06Q 20/22;
  G06Q 20/3678; G06Q 20/3821; G06Q
  20/401; G06Q 20/405; G06Q 40/04;
  G06Q 20/3674; G06Q 20/381; G06Q
  50/01; G06Q 20/40
 See application file for complete search history.

(56) References Cited

U.S. PATENT DOCUMENTS

| | | | | |
|---|---|---|---|---|
| 2011/0099376 A1* | 4/2011 | Gupta | ................... | H04L 9/321 |
| | | | | 713/171 |
| 2012/0047068 A1* | 2/2012 | Kanisawa | ............ | G06Q 20/105 |
| | | | | 705/41 |
| 2012/0265604 A1* | 10/2012 | Corner | ................... | H04W 4/21 |
| | | | | 705/14.39 |
| 2013/0275195 A1* | 10/2013 | Gabryelski | ........ | G06Q 30/0225 |
| | | | | 705/14.26 |
| 2015/0141125 A1* | 5/2015 | LeStrange | ............. | G06Q 20/04 |
| | | | | 463/25 |

OTHER PUBLICATIONS

Notification of the Second Office Action (CN Application No. 201480040684.6); dated May 17, 2019; Includes English Translation; 5 pages.

* cited by examiner

FIG. 12

FOR YOUR ID, YOUR PERSONAL INFORMATION IS GOING TO BE REGISTERED.

| USER ID | G_1234567890 |
|---|---|

CARD ID: ☐

BIRTH DATE: [yyyy] [mm] [dd]

USER PASSWORD CODE: ☐

LAST NAME: ☐

FIRST NAME: ☐

ADDRESS
- STATE: ☐
- CITY: ☐
- TOWN: ☐
- BLOCK NUMBER: ☐

TELEPHONE: ☐

[REGISTER]

NETWORK SYSTEM, AND SERVER APPARATUS, SERVER APPARATUS CONTROL METHOD, AND COMPUTER READABLE STORAGE MEDIUM FOR USE IN SAME

CROSS-REFERENCE TO RELATED APPLICATION

This application is a continuation of PCT Application No. PCT/JP2014/070379, filed Aug. 1, 2014, which claims priority to Japanese Patent Application No. 2013-161710, filed Aug. 2, 2013, the disclosures of which are hereby incorporated by reference in their entirety.

TECHNICAL FIELD

The present invention relates to a network system which allows a user to pay charge for service used via a terminal apparatus by the user by consuming electronic value held in association with identification information of the user.

BACKGROUND ART

As one of network systems which allows a user to pay charge for something by using an electronic value, there is known to be a game system (for example, the Patent Document #1: Japanese Patent NO. 4955729) in which: a function to identify game-play data of a game played by a user at a game machine by using first identification information unique for each medium owned by the user and to serve a first service such that the game-play data is stored on the server apparatus, and a function to identify each user by second identification information unique for each user and to serve a second service associated with a game by using a portable terminal and the like of the user are linked with each other by linking (associating) the first identification information and the second identification information with each other; and a user verified using the first identification information is allowed to consume the electronic value of the user stored in association with the second identification information, and thereby, the use is allowed to pay a charge for the first service such as a charge for game-play.

CITATION LIST

Patent Literature

Patent Document #1: PTL1: JP-B-4955729

SUMMARY OF INVENTION

Technical Problem

In conventional network systems, when the user obtain the second identification information, the system makes generally a user register personal information such as his/her name and address. However, the registration of such information is troublesome to a user who is not interested in the second service using a network and thinks that it is enough to play a game. As a result of that, such a user can not enjoy convenience of electronic value.

Therefore, the present invention aims to provide a network system and the like, where it is allowed to use electronic value within a predetermined range without registration of personal information.

Solution to Problem

A network system as one aspect of the present invention is a network system comprising a server apparatus and a plurality of terminal apparatuses connected with the server apparatus via a network, each of the plurality of terminal apparatuses obtaining from a user and serving to the server apparatus, at least any one of a first verification information including a first identification information set to a medium owned by the user uniquely for each medium; and a second verification information including a second identification information and at least a part of personal information of the user, the second identification information being set uniquely for each user and associated with the personal information of the user, wherein the server apparatus has a computer which, by executing a computer program, functions as: a first service serving device which is configured to serve to the user a first service based on data associated with the first identification information on condition that the first verification information is obtained from the terminal apparatus and the medium is verified; a second service serving device which is configured to serve to the user a second service based on data associated with the second identification information on condition that the second verification information is obtained from the terminal apparatus and the user is verified; an identification information linking device which is configured to link the first identification information and the second identification information with each other based on a requirement from the user via the terminal apparatus; a value managing device which is configured to store an amount of electronic value in association with the second identification information, the amount of electronic value being consumed as counter value of either the first service or the second service, and increase the amount of electronic value associated with the second identification information depending on a purchase amount of the user, in response to a purchase requirement from the terminal apparatus, the purchase requirement designating the second identification information or the first identification information being linked with the second identification information, while decreasing the amount of electronic value associated with the second identification information depending on the counter value to be consumed by the user, in response to a consumption requirement from the terminal apparatus, the consumption requirement designating the second identification information or the first identification information being linked with the second identification information; a correlation determining device which is configured to determine, in a case where use of electronic value is required with designation of the first identification information, from the terminal apparatus, whether the second identification information linked with the first identification information exists or not; and an identification information generating device which is configured to, in a case where the correlation determining device determines that the second identification information linked with the first identification information does not exist, generate a provisional second identification information which is not associated with the personal information, and link the provisional second identification information and the first identification information with each other.

A server apparatus as one aspect of the present invention is a server apparatus being connected to a plurality of terminal apparatuses via a network, each of the plurality of terminal apparatuses obtaining from a user and serving to the server apparatus, at least any one of a first verification information including a first identification information set to a medium owned by the user uniquely for each medium; and a second verification information including a second identification information and at least a part of personal information of the user, the second identification information being set uniquely for each user and associated with the personal information of the user, wherein the server apparatus has a computer which, by executing a computer program, functions as: a first service serving device which is configured to serve to the user a first service based on data associated with the first identification information on condition that the first verification information is obtained from the terminal apparatus and the medium is verified; a second service serving device which is configured to serve to the user a second service based on data associated with the second identification information on condition that the second verification information is obtained from the terminal apparatus and the user is verified; an identification information linking device which is configured to link the first identification information and the second identification information with each other based on a requirement from the user via the terminal apparatus; a value managing device which is configured to store an amount of electronic value in association with the second identification information, the amount of electronic value being consumed as counter value of either the first service or the second service, and increase the amount of electronic value associated with the second identification information depending on a purchase amount of the user, in response to a purchase requirement from the terminal apparatus, the purchase requirement designating the second identification information or the first identification information being linked with the second identification information, while decreasing the amount of electronic value associated with the second identification information depending on the counter value to be consumed by the user, in response to a consumption requirement from the terminal apparatus, the consumption requirement designating the second identification information or the first identification information being linked with the second identification information; a correlation determining device which is configured to determine, in a case where use of electronic value is required with designation of the first identification information, from the terminal apparatus, whether the second identification information linked with the first identification information exists or not; and an identification information generating device which is configured to, in a case where the correlation determining device determines that the second identification information linked with the first identification information does not exist, generate a provisional second identification information which is not associated with the personal information, and link the provisional second identification information and the first identification information with each other.

A server apparatus control method as one aspect of the present invention is a server apparatus control method being applied to a server apparatus connected to a plurality of terminal apparatuses via a network, each of the plurality of terminal apparatuses obtaining from a user and serving to the server apparatus, at least any one of a first verification information including a first identification information set to a medium owned by the user uniquely for each medium; and a second verification information including a second identification information and at least a part of personal information of the user, the second identification information being set uniquely for each user and associated with the personal information of the user, and the server apparatus having a computer which, by executing a computer program, functions as: a first service serving device which is configured to serve to the user a first service based on data associated with the first identification information on condition that the first verification information is obtained from the terminal apparatus and the medium is verified; a second service serving device which is configured to serve to the user a second service based on data associated with the second identification information on condition that the second verification information is obtained from the terminal apparatus and the user is verified; an identification information linking device which is configured to link the first identification information and the second identification information with each other based on a requirement from the user via the terminal apparatus; and a value managing device which is configured to store an amount of electronic value in association with the second identification information, the amount of electronic value being consumed as counter value of either the first service or the second service, and increase the amount of electronic value associated with the second identification information depending on a purchase amount of the user, in response to a purchase requirement from the terminal apparatus, the purchase requirement designating the second identification information or the first identification information being linked with the second identification information, while decreasing the amount of electronic value associated with the second identification information depending on the counter value to be consumed by the user, in response to a consumption requirement from the terminal apparatus, the consumption requirement designating the second identification information or the first identification information being linked with the second identification information, wherein the server apparatus control method includes: a step of determining, in a case where use of electronic value is required with designation of the first identification information, from the terminal apparatus, whether the second identification information linked with the first identification information exists or not; and a step of generating, in a case where the step of determining determines the second identification information linked with the first identification information does not exist, a provisional second identification information which is not associated with the personal information, and linking the provisional second identification information and the first identification information with each other.

A non-transitory computer readable storage medium as one aspect of the present invention is a non-transitory computer readable storage medium storing a computer program of a server apparatus having a computer, the server apparatus being connected to a plurality of terminal apparatuses via a network, each of the plurality of terminal apparatuses obtaining from a user and serving to the server apparatus, at least any one of a first verification information including a first identification information set to a medium owned by the user uniquely for each medium; and a second verification information including a second identification information and at least a part of personal information of the user, the second identification information being set uniquely for each user and associated with the personal information of the user, wherein the computer program is configured so as to make the computer function as: a first service serving device which is configured to serve to the user a first service based on data associated with the first identification information on condition that the first verification information is obtained from the terminal apparatus and the medium is verified; a second service serving device which is configured to serve to the user a second service based on data associated with the second identification information on condition that the second verification information is obtained from the terminal apparatus and the user is verified; an identification information linking device which is configured to link the first identification information and the second identification information with each other based on a requirement from the user via the terminal apparatus; a value managing device which is configured to store an amount of electronic value in association with the second identification information, the amount of electronic value being consumed as counter value of either the first service or the second service, and increase the amount of electronic value associated with the second identification information depending on a purchase amount of the user, in response to a purchase requirement from the terminal apparatus, the purchase requirement designating the second identification information or the first identification information being linked with the second identification information, while decreasing the amount of electronic value associated with the second identification information depending on the counter value to be consumed by the user, in response to a consumption requirement from the terminal apparatus, the consumption requirement designating the second identification information or the first identification information being linked with the second identification information; a correlation determining device which is configured to determine, in a case where use of electronic value is required with a designation of the first identification information, from the terminal apparatus, whether the second identification information linked with the first identification information exists or not; and an identification information generating device which is configured to, in a case where the correlation determining device determines that the second identification information linked with the first identification information does not exist, generate a provisional second identification information which is not associated with the personal information, and link the provisional second identification information and the first identification information with each other.

BRIEF DESCRIPTION OF DRAWINGS

FIG. 12 is a diagram showing one example of registration screen for obtaining from the user information necessary for the veritable registration.

DESCRIPTION OF EMBODIMENTS

Figure 1:
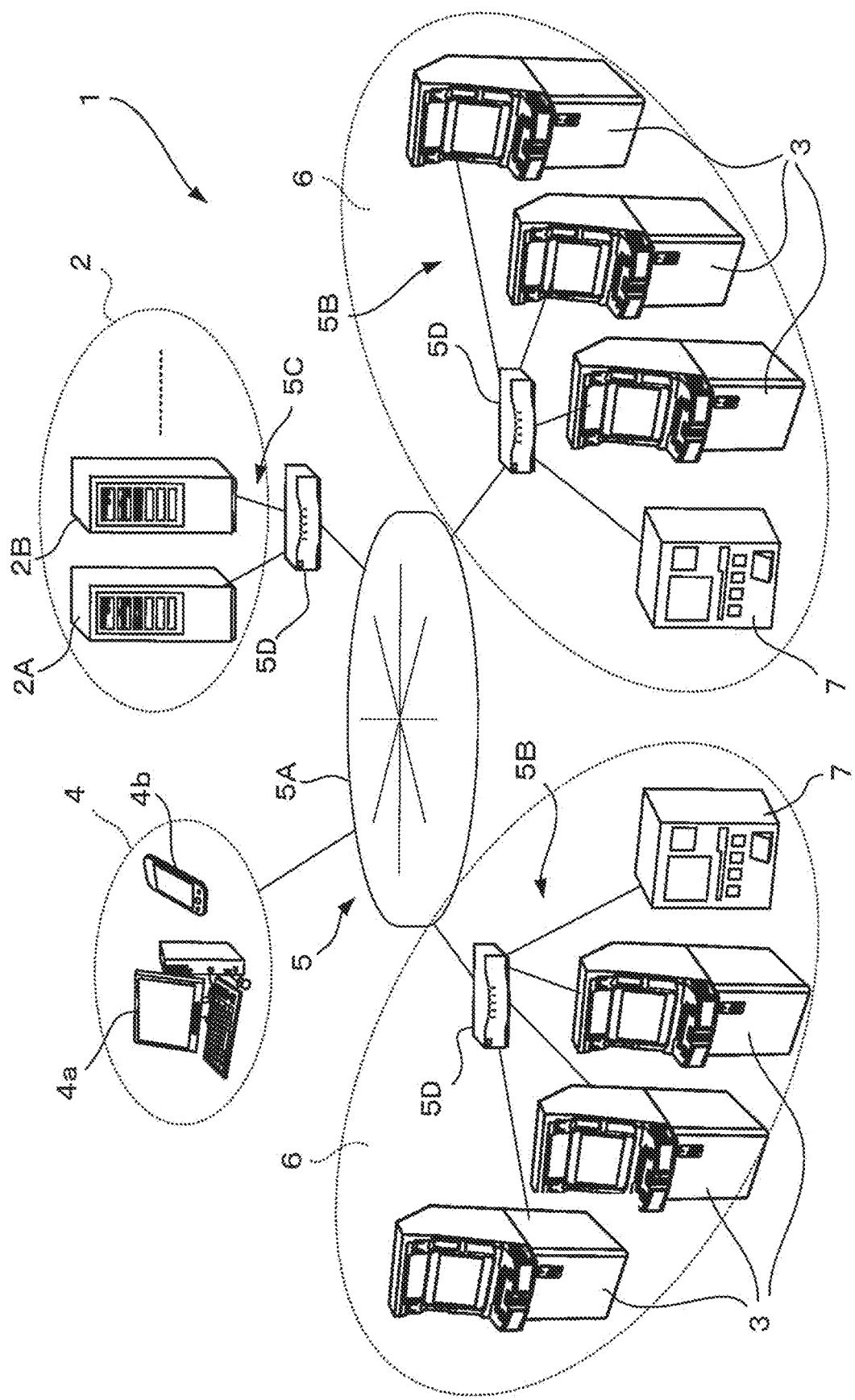
FIG. 1 is a diagram showing a whole configuration of a system according to one embodiment where a network system of the present invention is applied as a network type game system.

Hereinafter, one of embodiments where a network system of the present invention is applied as a network-type game system will be described. First, in reference to FIG. 1, a whole configuration of the game system 1 will be described. The game system 1 includes: a center server 2 as a server apparatus; and at least one game machine 3 and at least one user terminal apparatus 4 as terminal apparatuses capable of connecting to the center server 2 via a predetermined network 5. The center server 2 is configured as one logical server apparatus by combining server units 2A, 2B . . . as a plurality of computer apparatuses. However, the center server 2 may be configured by a single server unit. Alternatively, the center server 2 may be configured logically by using the cloud computing.

The game machine 3 is configured as a game machine for commercial use (business use) which allows, in exchange of payment of a predetermined game-play fee, a user to play a game within a range corresponding to the game-play fee. This type of the game machine 3 is sometimes called an arcade game machine. At the game machine 3, the game-play fee can be paid by cash or game media such as medals purchased by a user, and also, can be paid using virtual currency when a predetermined condition is satisfied. The virtual currency is an electronic value which can be consumed as counter value of each kind of service served by the center server. The game machine 3 is a computer apparatus which is installed into a predetermined facility such as a store 6 in order to make a lot of users play the game repeatedly mainly for making a good profit. In each store 6, an appropriate number, which is one or more, of game machines 3 are installed. In FIG. 1, though the game machines 3 are not distinguished from each other, hardware configuration and/or the content of the game may be selected as appropriate. The game machine 3 may be configured as a dedicated machine having a physical configuration (for example, an operation portion) fitting a specific game, or may be configured as a general-purpose machine which can be applied to various games by rewriting software.

On the other hand, the user terminal apparatus 4 is a computer apparatus which is capable of connecting to a network and is provided for personal use of a user. For example, a desktop or book personal computer (hereinafter, referred to as the "PC") 4a, or a mobile terminal apparatus 4b such as a portable phone (including a smart phone) is used as the user terminal apparatus 4. Further, various computer apparatuses which are capable of connecting to a network and are provided for personal use of a user, such as a stationary game machine for home use, a portable game machine, and a portable tablet terminal apparatus, may be used as the user terminal apparatuses 4. The user terminal apparatus 4 can allow users to use various kinds of services served by the center server 2 by mounting various kinds of computer software.

The network 5 may be configured as appropriate, as long as the game machines 3 and the user terminal apparatuses 4 can be connected through the network 5 to the center server 2 respectively. As one example, the network 5 is configured so as to realize network communication using the TCP/IP protocol. Typically, the network 5 is configured by connecting the internet 5A as a WAN and each LAN 5B, 5C via a router 5D, the LAN 5B, 5C connecting respectively the center server 2 and the game machines 3 to the internet 5A. Each user terminal apparatus 4 is also connected to the internet 5A by an appropriate configuration. In addition, the game machine 3 may be connected communicably to the center server 2 via a local server which is provided between the game machine 3 and the router 5D of the store 6. The server units 2A, 2B . . . of the center server 2 can be connected to each other through the WAN 5A, instead of or in addition to the LAN 5C.

The game system 1 is provided with a charge machine 7 as a further terminal apparatus. The charge machine 7 is installed to the store 6, and connected to the center server 2 via the network 5. The charge machine 7 is also a kind of computer machine, and has an input device for inputting letters, numerals and the like and an output device for outputting image and sound. The charge machine 7 functions as a terminal apparatus for addition which increases a balance of virtual currency of a user, the balance being managed by the center server 2, in exchange of payment of a purchase charge by a user. The user can purchase the virtual currency by paying a purchase charge, using the user terminal apparatus 4 or the charge machine 7, and add the virtual currency corresponding to the purchase charge to the balance being managed by the center server 2. When using the user terminal apparatus 4, the user can pay the purchase charge, using a credit card or an electronic settlement service, both of which are used as settlement means in a general network system. On the other hand, when using the charge machine 7, the user has to pay cash for the purchase charge.

Figure 2:
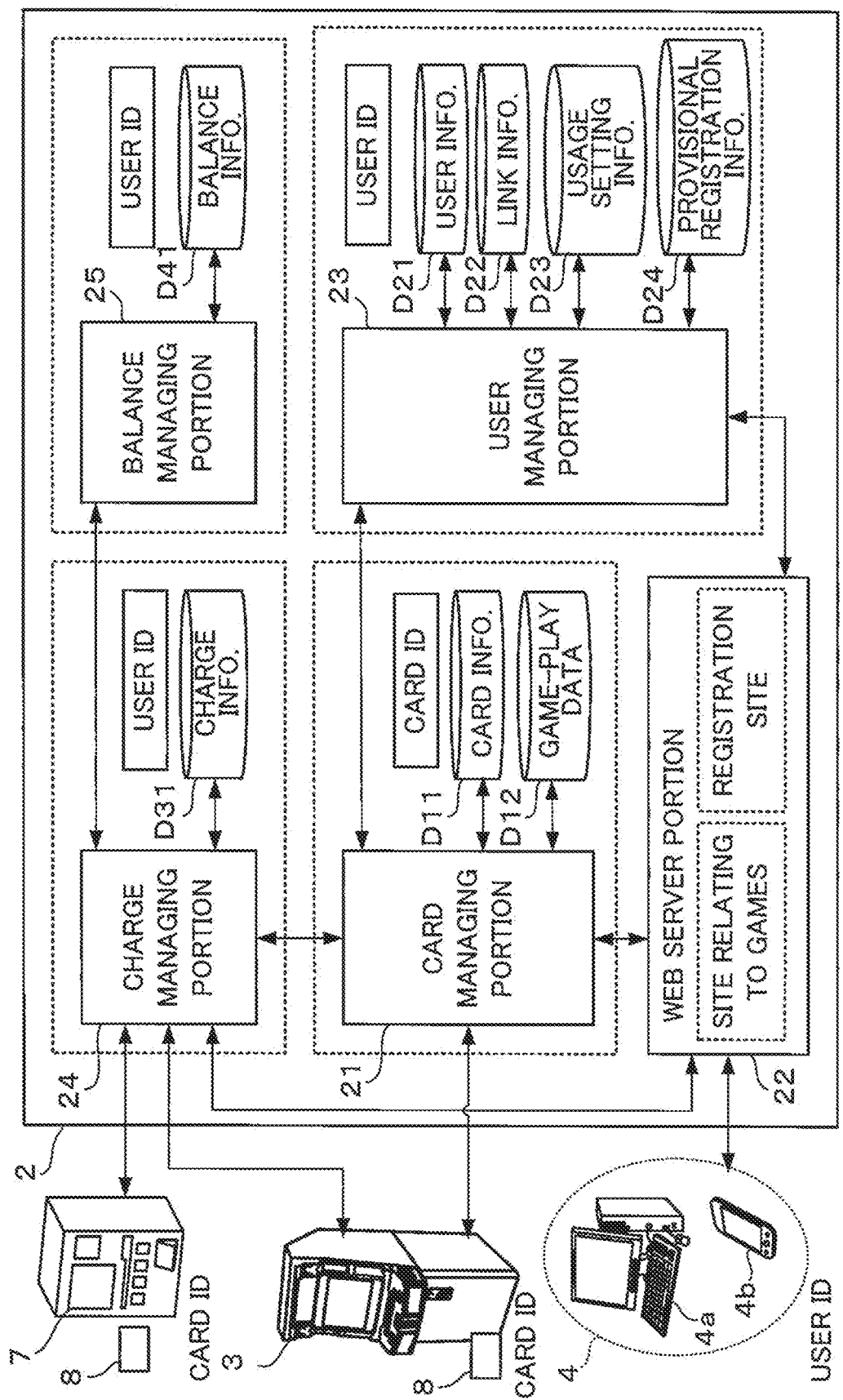
FIG. 2 is a functional block diagram showing a configuration of a control system of the game system shown in FIG. 1 by centering a center server.

Next, in reference to FIG. 2, a configuration of a control system in the game system 1 will be described. First, in the game system 1, two kinds of verification means are prepared, with respect to verification of an access from the terminal apparatus by the center server 2. With respect to an access from either the game machine 3 or the charge machine 7, a card ID is used as a first identification information, the card ID being set in a card 8 as a medium which is held by a user. The card ID and a card password code set by the user are used as a first verification information to verify the card 8. For example, the card ID, while being recorded in a storage medium such as an IC chip and magnetic stripe provided to the card 8, is written on a top surface or a rear surface of the card 8 so that the user can recognize the card ID. Each of the game machine 3 and the charge machine 7 is provided with a card reader (not illustrated) for reading out the card ID from the card 8 and an input device for inputting the card password code. Further, the card 8 may be verified by using only the card ID as the first verification information.

On the other hand, with respect to a user who accesses from the user terminal apparatus 4, a user ID unique for each user is used as a second identification information, the user ID being obtained by the user when accessing the center server 2. The user ID and a user password code set by the user are used as a second verification information to verify the user. However, the user of the user terminal apparatus 4 can transmit the card ID and the card password code which are recorded on the card 8 from the user terminal apparatus 4 to the center server 2. Each of the card password code and the user password code is not limited to numerals and may include English letters, symbols, or the like.

On the other hand, the center server 2 is provided with a card managing portion 21, a Web server portion 22, a user managing portion 23, a charge managing portion 24, and a balance managing portion 25, as logical devices configured by a combination of computer hardware and predetermined computer programs as software. The card managing portion 21 is configured to manage data groups each being associated with the card ID, and serve to a user a first service based on the data group. The data group managed by the card managing portion 21 includes, for one example, data D11 of card information and game-play data D12. In the data D11 of card information, various kinds of information relating to the card 8 are stored in association with the card ID. For example, the card password code set for the card ID by the user is stored in the data D11 of card information. When a card ID whose card password code is not stored in the data D11 is read out at the game machine 3 or the like, the card password code is designated by the user and recorded in association with the card ID in the data D11.

The game-play data D12 is data where a game-play content performed by a user in a game of the game machine 3 is recorded. The game-play data D12 is generated for each type of game machine 3, or each game title, and stored in association with the card ID. However, if the game-play data D12 is associated with the card ID so as to be specified uniquely by the card ID and the type of game machine 3, the game-play data D12 will do. Accordingly, further another ID or the like may intervene between the card ID and the game-play data D12.

The Web server portion 22 publishes on the network 5, web sites which is accessible from the user terminal apparatuses 4, and is configured to serve various kinds of information to the user terminal apparatuses 4 and obtain information from the user terminal apparatuses 4. As one example, the Web server portion 22 publishes a site relating to games and a registration site. The site relating to games is a site for serving to users, various kinds of information associated with the game which is served at the game machine 3, or serving to users of the user terminal apparatuses 4, a site for exchanging information relating to the game by using an SNS (a social networking). The registration site is a site which allows a user of the user terminal apparatus 4 to obtain his/her user ID; and input his/her personal information which should be recorded in association with the user ID and register (store) the personal information on the center server 2.

The user managing portion 23 manages a data group being associated with user IDs, and serves a second service based on the data group to the user in cooperation with the Web server portion 22. The data group managed by the user managing portion 23, as one example, includes: data D21 of user information; data D22 of link information; data D23 of usage setting information; and data D24 of provisional registration information. In the data D21 of user information, personal information of a user is recorded in association with his/her user ID, the personal information being inputted by the user to the user terminal apparatus 4 when the user obtains his/her user ID. The personal information includes not only typical information which can specify a specific user such as user's name, address, and telephone number, but also a password code (a user password code) set by the user for his/her user ID. Further, the information stored in the data D21 of user information may include settlement information such as information of a credit card designated by the user for settlement. In the data D22 of link information, stored is information for linking (associating) the card ID of the card 8 owned by a user and the user ID obtained by the user with each other. Those IDs are linked with each other based on a linking requirement from the user via the user terminal apparatus 4. For example, in a case where a user, by using the user terminal apparatus 4, specifies his/her user ID and the card ID which should be linked with the user ID to require to link the two IDs, the requirement is transmitted to the user managing portion 23 via the Web server portion 22, and the user managing portion 23 records information indicating a correlation of the user ID and the card ID in the data D22 of link information. Thereby, the linking is realized. It may be permitted to link plural card IDs with a single user ID, but it is impossible to link a single card ID with plural user IDs. The user ID and the card ID may be directly linked with each other, or linked with each other through other some IDs.

In the data D23 of usage setting information, information for determining whether virtual currency is used in the game system 1 is stored in association with the user ID. A conception of use of virtual currency includes both of purchase and consumption with respect to the virtual currency. Hereinafter, with respect to the usage setting information, a state that the virtual currency is set to be available is sometimes represented as such an expression that the usage setting is ON, and a state that the virtual currency is set to be unavailable is sometimes represented as an expression that the usage setting is OFF. The usage setting of virtual currency is switched between ON and OFF based on an instruction from a user via the user terminal apparatus 4. However, as an exceptional case, there is a case where the user managing portion 23 controls the usage setting information. This case will be described later. In the data D24 of provisional registration information, information for determining whether the user ID is a user ID provisionally registered or not is recorded for each user ID. Here, the user ID provisionally registered means a user ID which was generated automatically on predetermined condition by the user managing portion 23 without obtaining personal information from the user, and was recorded in the data D21 of user information. Hereinafter, in order to distinguish from the provisional registration, an operation for recording personal information inputted by a user and a user ID in association with each other in the data D21 of user information is represented as a veritable registration, and the user ID associated with the personal information of the user is sometimes represented as a veritably registered user ID. The details of the provisional registration will be described later.

The charge managing portion 24 and the balance managing portion 25 are configured to execute processing necessary for payment of counter value by virtual currency. The balance managing portion 25 will be described in first. The balance managing portion 25 manages data D41 of balance information of virtual currency associated with a user ID. In the data D41 of balance information, the balance of virtual currency owned by each user is recorded in association with each user ID. On the other hand, the charge managing portion 24 obtains from the charge machine 7 or the user terminal apparatus 4, information necessary for accumulation or subtraction with respect to the balance of virtual currency, and instructs the balance managing portion 25 to add or subtract with respect to the balance of virtual currency by following the information obtained. Further, the charge managing portion 24 also manages data D31 of charge information. The data D31 of charge information is data where history of addition and subtraction and the like with respect to the virtual currency caused by a user are recorded in association with his/her user ID.

Figure 3:
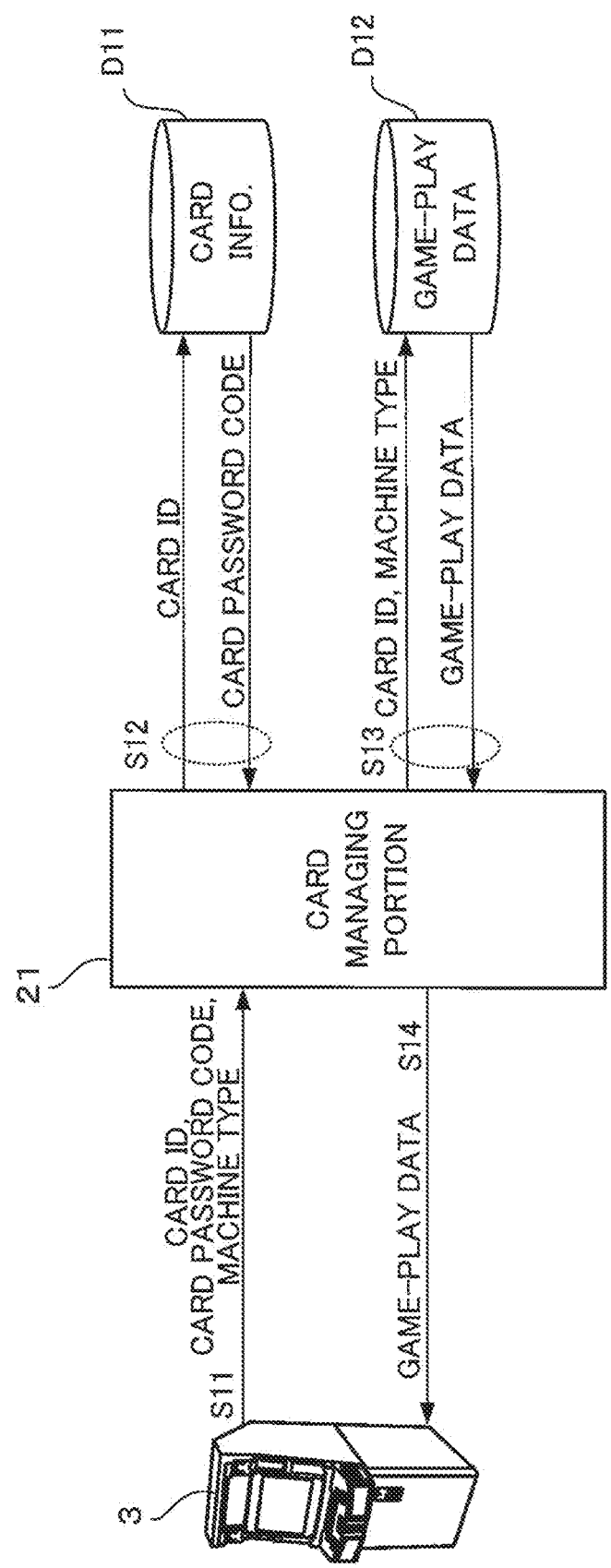
FIG. 3 is a diagram showing processing procedure where a card managing portion of the center server serves game-play data of a user to a game machine as one kind of a first service.

Next, in reference to FIGS. 3 to 13, the processing, which the center server 2 executes to serve various kinds of services, will be described. First, in reference to FIG. 3, one example of processing that the center server 2 serves the first service to a user will be described. FIG. 3 shows processing procedure that the center server 2 serves the game-play data D12 to the game machine 3 as a kind of the first service. First, as the premise of provision of the game-play data D12, the game machine 3 reads out the card ID of the card 8 owned by a user and also obtains the card password code from the user. And then, the game machine 3 requires the card managing portion 21 of the center server 2 to serve the game-play data D12 (step S11), with designating the card ID and the card password code which have been obtained, and information for discriminating the type of the game machine 3 (hereinafter referred to as "the machine-type information"). The card managing portion 21 verifies the card 8 (step S12) by obtaining from the data D11 of card information the card password code corresponding to the card ID obtained from the game machine 3 and checking the card password code obtained from the game machine 3 against the card password code obtained from the data D11 of card information. After completing the verification, the card managing portion 21 obtains the game-play data D12 associated with the card ID of the card 8 owned by the user and the type of the game machine 3 (step S13) by using the card ID and the machine-type information obtained from the game 3. After that, the card managing portion 21 transmits the game-play data D12 obtained to the game machine 3 (step S14). In this way, the card managing portion 21 is configured to use various kinds of information associated with the card ID of the card 8 owned by a user and serve to the user the first service corresponding to the card ID. That is, if a user obtains a card 8 and registers the card ID of the card 8 and a card password code in the data D11 of card information, the user can use the first service which premises the verification of the card 8.

Figure 4:
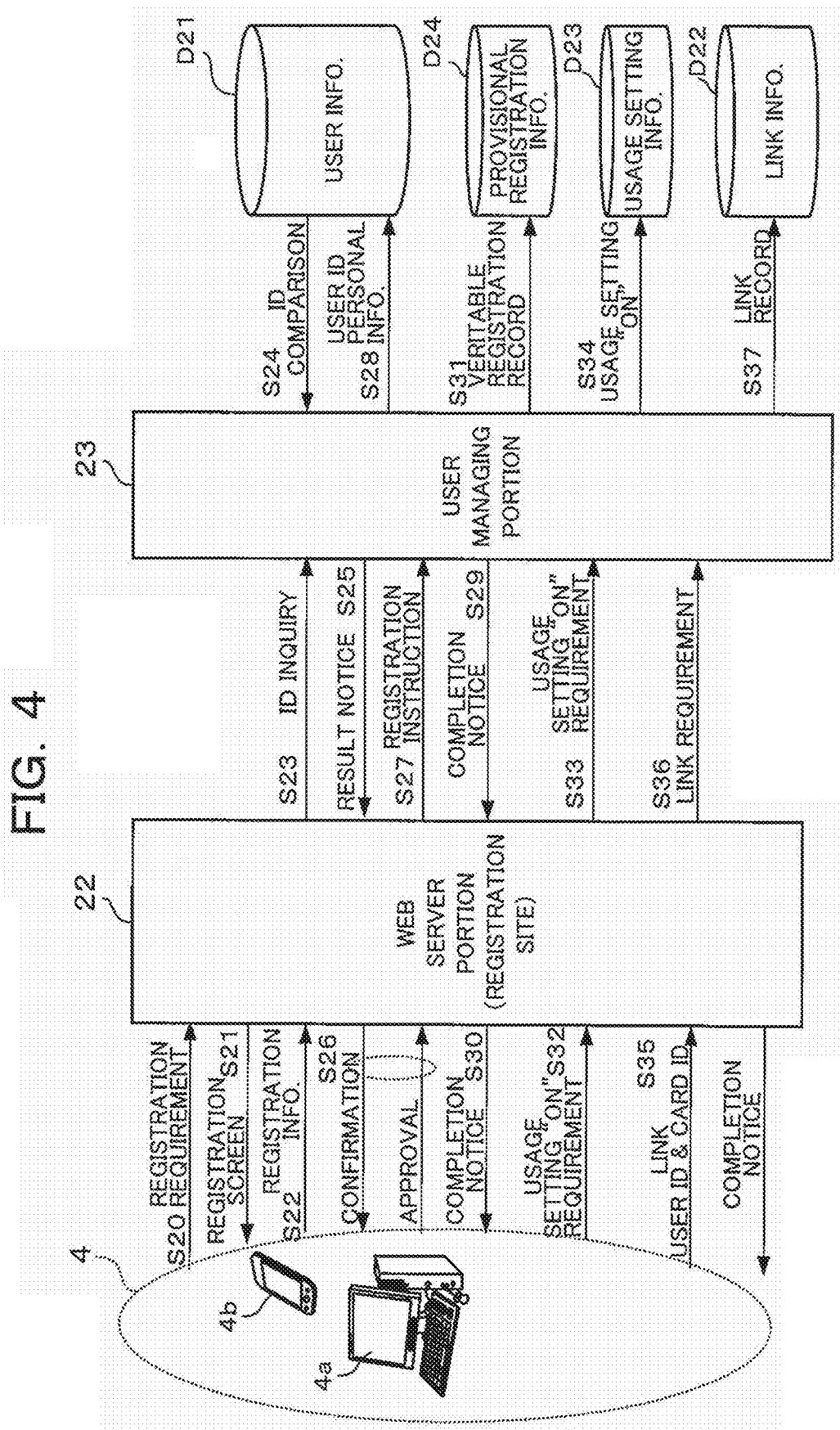
FIG. 4 is a diagram showing processing procedure where a user is made to register his/her personal information to obtain his/her user ID as a second identification information.

Next, one example of processing for serving the second service to a user via the user terminal apparatus 4 will be described. In order for a user to use the second service, as the premise, the user has to register his/her personal information and obtain his/her user ID. One example of this processing will be described using FIG. 4. The processing of FIG. 4 is started, when the user accesses the registration site of the Web server portion 22 via the user terminal apparatus 4 and requires to register his/her personal information (step S20). In response to the requirement of registration, the Web server portion 22 transmits screen (registration screen) information for making the user input information necessary for registration (step S21). When the user inputs the information (registration information) necessary for registration at the user terminal apparatus 4, the registration information is served to the Web server portion 22 (step S22). The information to be inputted is the user ID desired by the user, and his/her personal information. The personal information includes the user password code. The user password code should be set so as to have a security level higher than the card password code.

When obtaining the registration information from the user terminal apparatus 4, the Web server portion 22 serves the user ID included in the registration information to the user managing portion 23 to inquire whether the user ID is available for the registration (step S23). When receiving this inquiry, the user managing portion 23 compares the user ID desired by the user to the user IDs registered in the data D21 of user information, and determines whether or not the user ID desired by the user is unique (step S24). Subsequently, the user managing portion 23 notices the determination result to the Web server portion 22 (step S25). When confirming that the user ID is unique, the Web server portion 22 confirms to the user via the user terminal apparatus 4 whether or not the user approves the registration of the registration information to obtain the approval of the user from the user terminal apparatus 4 (step S26). After that, the Web server portion 22 instructs the user managing portion 23 to register the registration information obtained at step S22 in the data D21 of user information (step S27). When receiving the instruction of the registration, the user managing portion 23 registers the personal information of the user in association with the user ID in the data D21 of user information (step S28). When completing the registration in the data D21, the user managing portion 23 notices the completion of the registration to the Web server portion 22 (step S29), and the Web server portion 22 transmits the notice of completion of the registration to the user terminal apparatus 4 (step S30). After completing the registration of the user ID and the user password code and the like, the user managing portion 23 registers in the data D24 of provisional registration information, information indicating that the user ID is veritably registered (step S31).

By the above mentioned procedure, it is completed to obtain the user ID and register the personal information while using the user terminal apparatus 4. After this, the user is allowed to use the second service based on various kinds of data associated with the user ID of the user, by transmitting the user ID and the user password code to the Web server portion 22 from the user terminal apparatus 4 in order to acquire the verification. However, in order for the user to use virtual currency in association with the second service, it is necessary that the usage setting information of virtual currency corresponding to the user ID of the user is set to be ON. Further, in order for the user to use virtual currency for the first service served after the verification using the card ID, it is necessary to link the card ID and the user ID with each other. Such procedure may be executed separately from obtainment of the user ID. However, FIG. 4 exemplifies a case where the usage setting and the linking are executed subsequently to the obtainment of the user ID.

First, with respect to the usage setting, it is required from the user terminal apparatus 4 to set the usage setting of virtual currency to be ON (step S32). When receiving the requirement, the Web server portion 22 requires, with designating the user ID obtained from the user terminal apparatus 4, the user managing portion 23 to set the usage setting to be ON (step S33). When receiving the requirement, the user managing portion 23 records information indicating that the usage setting is ON in the data D23 of usage setting information corresponding to the user ID designated (step S34). With respect to the linking of IDs, in response to the requirement from the user via the user terminal apparatus 4, the Web server portion 22 obtains the card ID and the user ID which are desired to be linked from the user terminal apparatus 4 (step S35), and serves the card ID and the user ID to the user managing portion 23 (step S36). The user managing portion 23 records information indicating that the card ID and the user ID are linked with each other, the card ID and the user ID being designated from the user terminal apparatus 4 (step S37).

In a case that the above processing is completed, the user is allowed to use the second service where data associated with the user ID of the user is used, by designating the user ID and the user password code to make the center server 2 verify the user himself/herself. Further, in a case that at least one part of the second service is a pay service, it is possible to pay the counter value by consuming the virtual currency. If the user pays a purchase fee by using the user terminal apparatus 4, it is possible to increase the balance of virtual currency owned by the user by the amount corresponding to the fee paid. As mentioned above, the purchase of virtual currency from the user terminal apparatus 4 is executed by using the electronic settlement means such as a credit card. Further, due to the card ID and the user ID which are linked with each other, the user is allowed to increase the balance of virtual currency using the charge machine 7, or to pay counter value of the first service by consuming the virtual currency. Hereinafter, on the premise that a user has his/her user ID veritably registered, the user ID and the card ID are linked with each other, and a predetermined amount of balance of virtual currency is stored in association with the user ID, processing for consuming the virtual currency when each service is used will be described.

Figure 5:
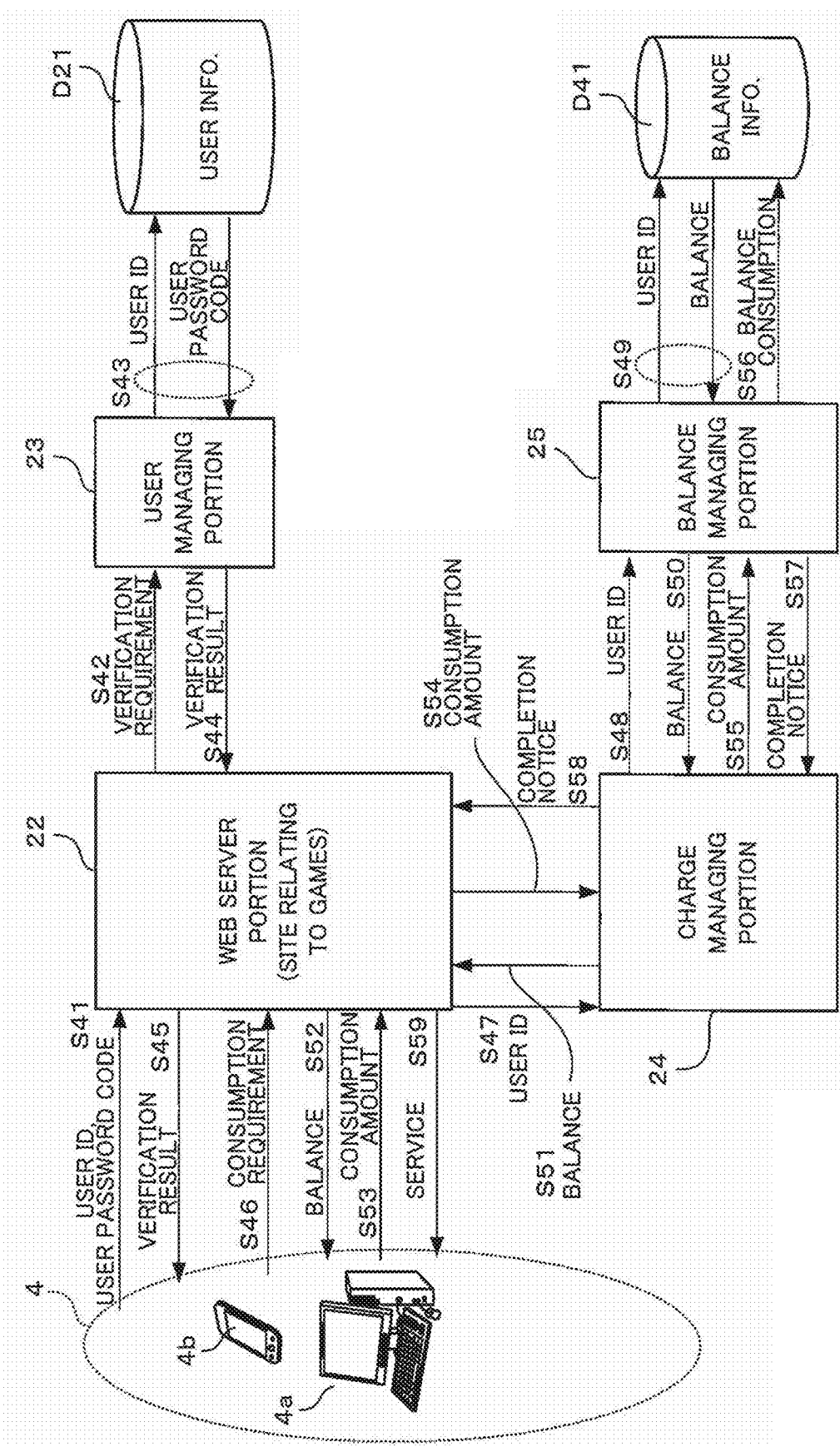
FIG. 5 is a diagram showing processing procedure to be executed when the user uses the second service via a user terminal apparatus.

FIG. 5 shows one example of processing which is executed when the user uses the second service via the user terminal apparatus 4. In FIG. 5, when the verification is required from the user of the user terminal apparatus 4 to the site relating to games served by the Web server portion 22, the Web server portion 22 first obtains the user ID and the user password code from the user terminal apparatus 4 (step S41). Next, the Web server portion 22 requires, with designating the user ID and user password code obtained, the user managing portion 23 to verify the user (step S42). The user managing portion 23 obtains from the data D21 of user information, the user password code corresponding to the user ID designated, and verifies the user by checking the user password code obtained from the data D21 against the user password code obtained from the user terminal apparatus 4 (step S43). After that, the user managing portion 23 notices the verification result to the Web server portion 22 (step S44). The Web server portion 22 transmits the verification result to the user terminal apparatus 4 (step S45).

When completing such user verification, the user is allowed to use the second service served on the site relating to games. In a case where the user selects a pay service which requires a payment of counter value and also selects a payment of the counter value by consuming virtual currency, it is required to consume the virtual currency from the user terminal apparatus 4 to the Web server portion 22 (step S46). When receiving the requirement, the Web server portion 22 requires, with designating the user ID, the charge managing portion 24 to confirm the balance of virtual currency (step S47). In response to the confirmation requirement, the charge managing portion 24 requires, with designating the user ID, information of the balance of virtual currency recorded in association with the user ID, to the balance managing portion 25 (step S48). In response to the requirement, the balance managing portion 25 obtains from the data D41 of balance information, the balance of virtual currency associated with the user ID designated (step S49), and notices to the charge managing portion 24 the balance obtained (step S50). The charge managing portion 24 notices to the Web server portion 22 the balance obtained (step S51). The Web server portion 22 notices the balance to the user terminal apparatus 4 (step S52).

When the user confirms the balance at the user terminal apparatus 4 and approves to consume the balance, a consumption amount of virtual currency corresponding to a counter value of the pay service is noticed from the user terminal apparatus 4 to the Web server portion 22 (step S53). The Web server portion 22 requires, with designating the consumption amount noticed, the charge managing portion 24 to consume the virtual currency (step S54). When receiving the requirement of the consumption, the charge managing portion 24 requires, with designating the consumption amount, the balance managing portion 25 to consume the virtual currency associated with the user ID (step S55). In response to the requirement, the balance managing portion 25 subtracts the consumption amount designated from the balance of virtual currency which is recorded in the data D41 of balance information in association with the user ID (step S56). When completing the consumption, the balance managing portion 25 notices the completion of consumption to the charge managing portion 24 (step S57), and the charge managing portion 24 notices the completion of consumption to the Web server portion 22 (step S58). When receiving the notice of the completion of consumption from the charge managing portion 24, the Web server portion 22 serves the pay service desired by the user (step S59).

Figure 6:
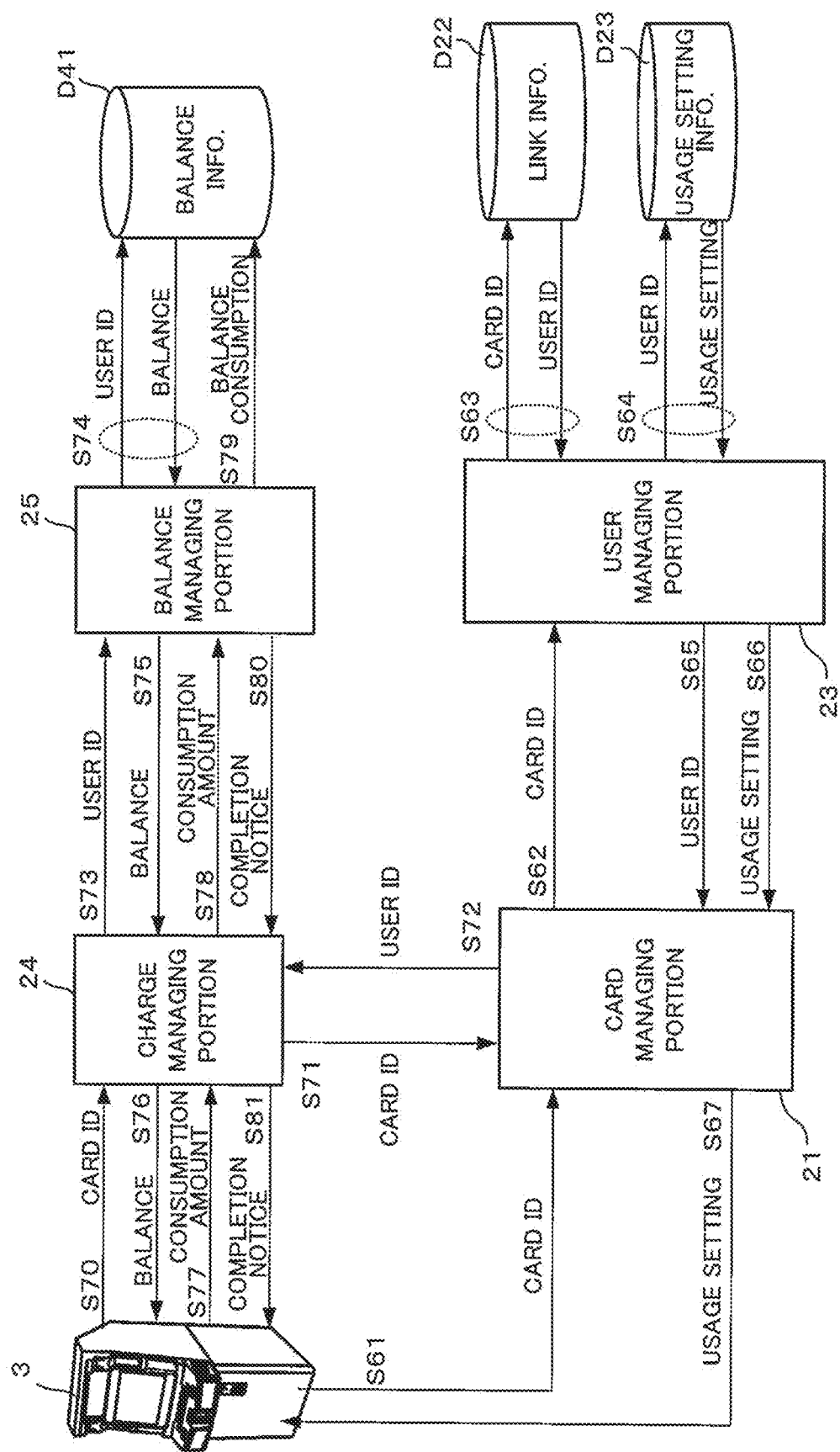
FIG. 6 is a diagram showing processing procedure to be executed for paying a counter value of the first service by consuming virtual currency when the user uses the first service via the game machine.

FIG. 6 shows one example of processing procedure which is executed for paying when the user uses the first service via the game machine 3, counter value of the first service by consuming the virtual currency. The first service after completion of payment is, as one example, a service that the user is allowed to play a game at the game machine 3 and the game-play data D12 of the user is served in accordance with the procedure of FIG. 3, or the like. In FIG. 6, it is assumed that the verification of the card 8 using the card ID and the card password code has been completed, and the game machine 3 holds the card ID and the card password code which were used for the verification.

In FIG. 6, when the user of the game machine 3 requires to pay the counter value of the service by consuming the virtual currency, first, the game machine 3 requires, with designating the cared ID, the card managing portion 21 to confirm a state of the usage setting of virtual currency (step S61). The card managing portion 21 requires, with designating the card ID obtained from the game machine 3, the user managing portion 23 to confirm the user ID and the like (step S62). In response to the requirement, the user managing portion 23 obtains from the data D22 of linking information, the user ID linked with the card ID designated (step S63), and obtains from the data D23 of usage setting information, a state of the usage setting information (ON or OFF) associated with the user ID obtained (step S64). After that, the user managing portion 23 notices to the card managing portion 21, the user ID and the usage setting state recognized (steps S65 and S66). The card managing portion 21 holds the user ID served from the user managing portion 23 in association with the card ID, and notices to the game machine 3, the state of the usage setting information (step S67). In a case where the usage setting state is OFF, the virtual currency is unavailable. Due to this, after the notice of the usage setting information, the information noticed may be deleted by the card managing portion 21.

When receiving the state of the usage setting information from the card managing portion 21, the game machine 3 determines whether or not the state of usage setting is ON. If the state is ON, the game machine 3 goes to processing necessary for consumption of the virtual currency, the processing executed with the charge managing portion 24. If the state of usage setting is OFF, the following processing is not executed, and the user is required from the game machine 3 to pay the counter value by the other settlement means such as cash.

In a case where the processing for the consumption of virtual currency goes on, it is required to confirm the balance of virtual currency from the game machine 3 to the charge managing portion 24 (step S70). In response to the requirement of confirmation, the charge managing portion 24 requires, with noticing the card ID, the card managing portion 21 to obtain the user ID associated with the card ID (step S71). In response to this, the card managing portion 21 notices the user ID previously obtained to the charge managing portion 24 (step S72). However, in this step, the card managing portion 21 may execute the following processing. The card managing portion 21 notices the card ID to the user managing portion 23 again to obtain the user ID associated with the card ID, and notices the user ID to the charge managing portion 24.

When obtaining the user ID from the card managing portion 21, the charge managing portion 24 requires, with designating the user ID, information of the balance of virtual currency recorded in association with the user ID, to the balance managing portion 25 (step S73). In response to the requirement, the balance managing portion 25 obtains from the data D41 of balance information, the balance of virtual currency associated with the user ID designated (step S74), and notices the balance to the charge managing portion 24 (step S75). The charge managing portion 24 notices the balance obtained to the game machine 3 (step S76).

When the user confirms the balance at the game machine 3, and approves to consume the balance, the game machine 3 requires, with designating the consumption amount of virtual currency corresponding to the counter value of the first service, the charge managing portion 24 to consume the virtual currency (step S77). When receiving the requirement of consumption, the charge managing portion 24 requires, with designating the consumption amount, the balance managing portion 25 to consume the virtual currency associated with the user ID (step S78). In response to the requirement, the balance managing portion 25 subtracts the consumption amount designated from the balance of virtual currency recorded in association with the user ID in the data D41 of balance information (step S79). After completing the consumption, the balance managing portion 25 notices the completion of consumption to the charge managing portion 24 (step S80), and the charge managing portion 24 notices the completion of consumption to the game machine 3 (step S81). Thereby, the counter value necessary for using the first service at the game machine 3 is paid by the consumption of virtual currency. After this, the user is allowed to use the first service within a range of the counter value.

Figure 7:
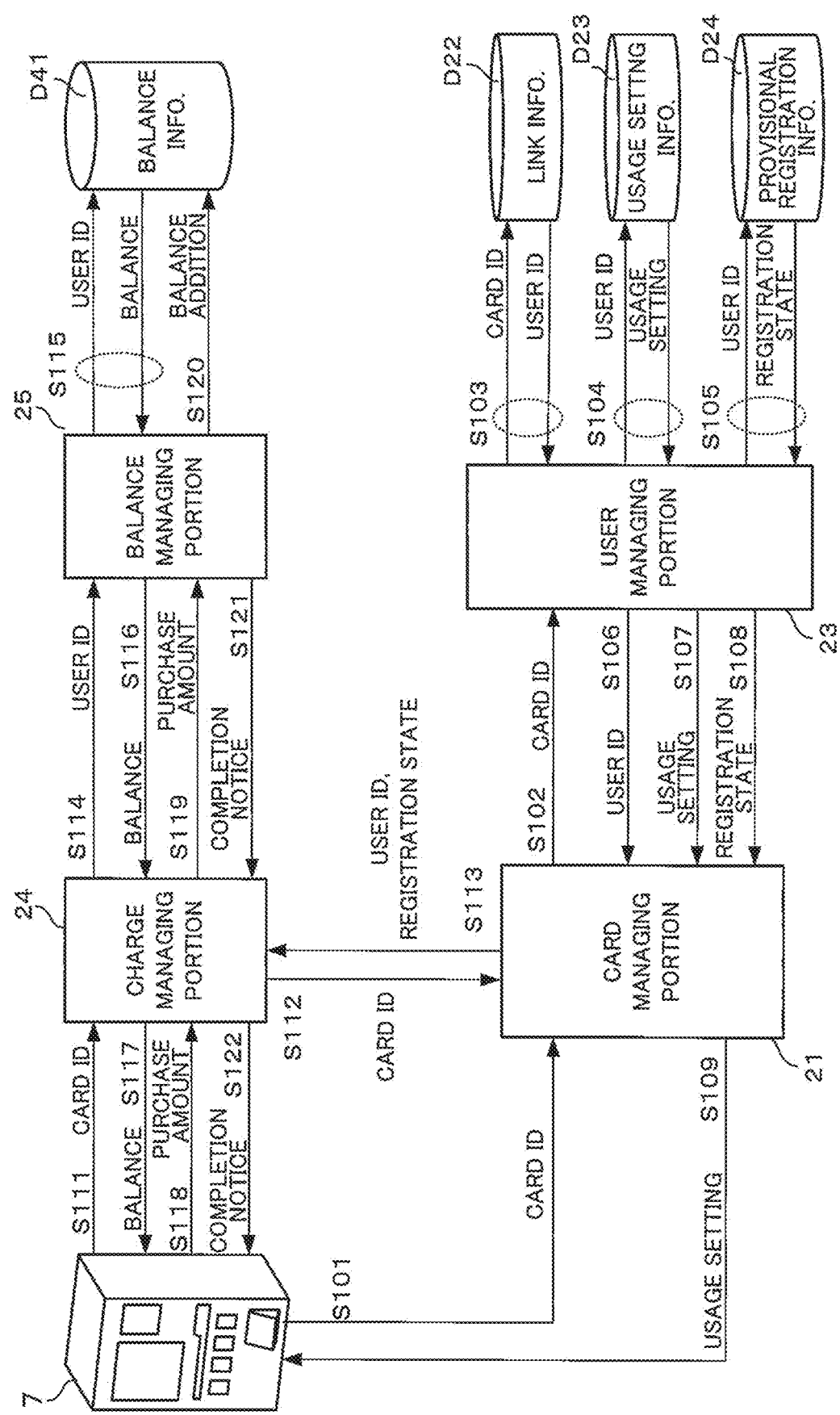
FIG. 7 is a diagram showing procedure of purchase processing of virtual currency executed when a card ID linked with the user ID is used.
Figure 8:
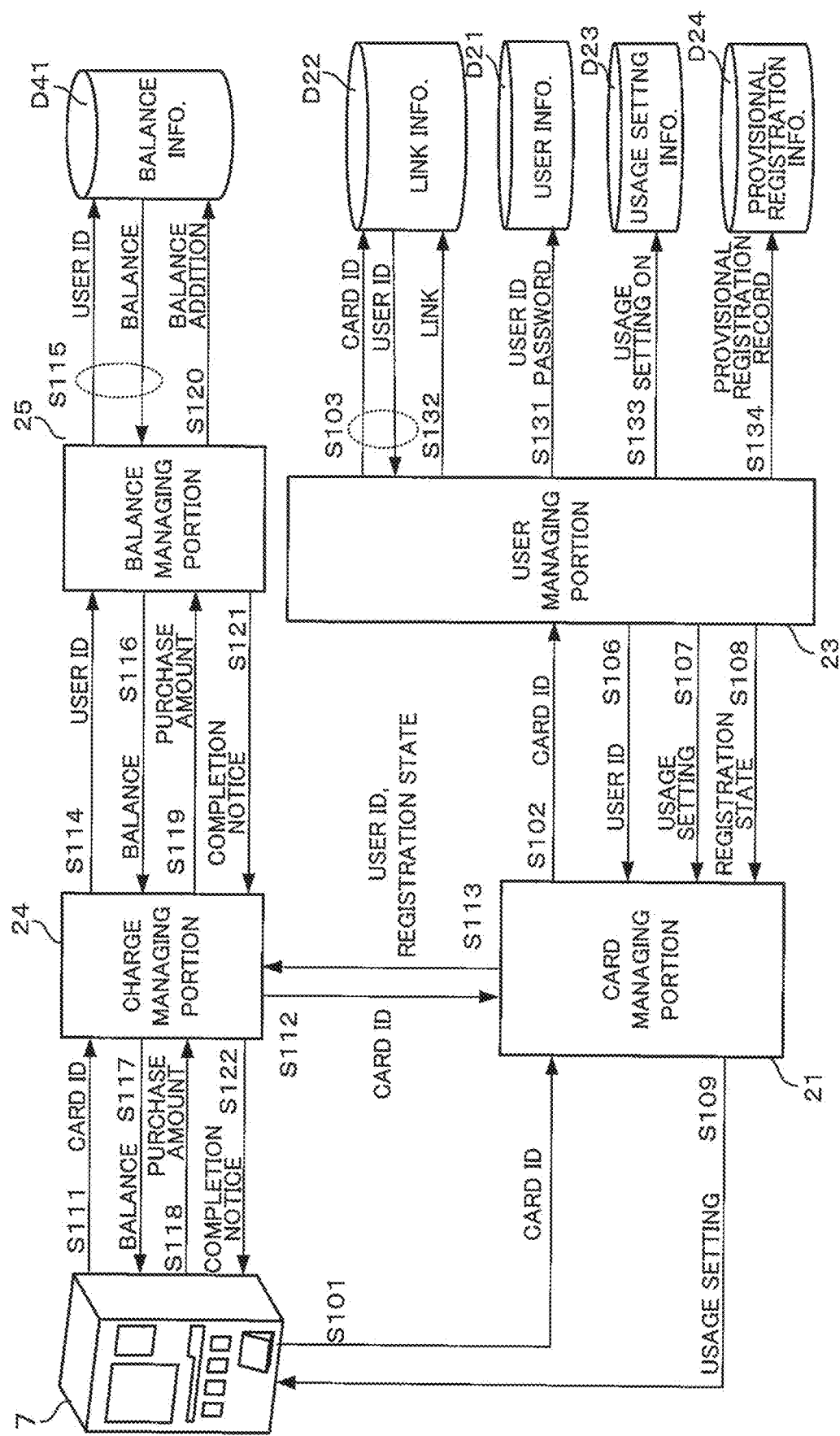
FIG. 8 is a diagram showing procedure of purchase process of virtual currency executed when a card ID not linked with the user ID is used.

Next, processing executed when the user purchases the virtual currency by using the charge machine 7, that is, when the balance is increased. FIG. 7 shows procedure of purchase processing which is executed in a case where the card ID linked with the user ID is used, FIG. 8 shows procedure of purchase processing executed in a case where the card ID not linked with the user ID is used. In both of the cases, it is assumed that the card password code is recorded in association with the card ID in the data D11 of card information, and also the card 8 has been verified based on the card ID and the card password code, which were obtained by the charge machine 7. Since the procedure for verifying the card 8 in this case is similar to step S11 and step S12 in FIG. 3, the description thereof is omitted. However, in the verification of the card 8 using the charge machine 7, the procedure for determining the type of game machine 3 is unnecessary. Further, in a case where the card password code is not set, since it is impossible to verify the card 8, the processing of each of FIG. 7 and FIG. 8 is forbidden. In this case, the following processing may be applied. The user is allowed to set the card password code via the charge machine 7, and the card password code is recorded in association with the card ID in the data D11 of card information, and then, the processing of FIG. 8 goes on.

First, the procedure shown in FIG. 7 will be described. When the user requires the purchase of virtual currency to the charge machine 7, the charge machine 7 requires, with designating the card ID, the card managing portion 21 to confirm the usage setting state of virtual currency (step S101). The card managing portion 21 requires, with designating the card ID obtained from the charge machine 7, the user managing portion 23 to confirm the user ID and the like (step S102). When receiving the requirement, the user managing portion 23 obtains from the data D22 of linking information, the user ID linked with the card ID designated (step S103), and obtains from the data D23 of usage setting information, a state of the usage setting information (ON or OFF) associated with the user ID obtained (step S104). Further, the user managing portion 23 obtains from the data D24 of provisional registration information, a registration state of the user ID obtained, that is, information for determining whether the user ID is a user ID provisionally registered or not (step S105). The reason why information of the registration state is obtained is that a difference with respect to the purchase of virtual currency is provided between the user ID provisionally registered and the user ID veritably registered. This point will be described.

After that, the user managing portion 23 notices, to the card managing portion 21, the user ID, the usage setting state, and the registration state, which have been determined (steps S106 to S107). The card managing portion 21 notices the state of usage setting information to the charge machine 7, while holding in association with the card ID, the user ID and information of the registration state which have been served by the user managing portion 23 (step S109). In a case where the usage setting state is OFF, the virtual currency is unavailable. Due to this, after the notice of the usage setting information, the information noticed may be deleted by the card managing portion 21.

When receiving the state of usage setting information from the card managing portion 21, the charge machine 7 determines whether the usage setting is ON or not. In a case of ON, subsequently, the procedure moves to processing necessary for purchase of virtual currency which is executed with the charge managing portion 24. In a case where the usage setting state is OFF, the following processing is not executed.

When the procedure moves to the purchase of virtual currency, the charge machine 7 requires, with designating the card ID, the charge managing portion 24 to confirm the balance of virtual currency (step S111). In response to the requirement of confirmation, the charge managing portion 24 requires, with noticing the card ID, the card managing portion 21 to notice the user ID and the registration state which are associated with the card ID noticed (step S112). When receiving this requirement, the card managing portion 21 notices to the charge managing portion 24, the user ID and the registration state which have been obtained previously (step S113). However, in this step, the card managing portion 21 may execute the following processing. The card managing portion 21 notices the card ID again to the user managing portion 23 to obtain the user ID associated with the card ID and the registration state with respect to the user ID, and notices the user ID and information of the registration state to the charge managing portion 24. The intended purpose of the registration state obtained by the charge managing portion 24 will be described with FIG. 13 later.

When obtaining the user ID from the card managing portion 21, the charge managing portion 24 requires, with designating the user ID obtained, information of the balance of virtual currency recorded in association with the user ID to the balance managing portion 25 (step S114). In response to the requirement, the balance managing portion 25 obtains from the data D41 of balance information, the balance of virtual currency associated with the user ID designated (step S115), and notices the balance obtained to the charge managing portion 24 (step S116). The charge managing portion 24 notices the obtained balance to the charge machine 7 (step S117).

When the user confirms the balance at the charge machine 7, determines the purchase amount of virtual currency, and pays the purchase charge by cash, the charge machine 7 requires, with designating the purchase amount corresponding to the amount paid by the user, the purchase of virtual currency to the charge managing portion 24 (step S118). When receiving the requirement of purchase, the charge managing portion 24 requires, with designating the purchase amount, the balance managing portion 25 to increase the balance of virtual currency associated with the user ID (step S119). In response to the requirement, the balance managing portion 25 adds the purchase amount designated to the balance of virtual currency, the balance being recorded in the data D41 of balance information in association with the user ID (step S120). When completing the addition, the balance managing portion 25 notices the completion of addition to the charge managing portion 24 (step S121), and the charge managing portion 24 notices the completion to the charge machine 7 (step S122). Thereby, the purchase of virtual currency with the charge machine 7 is completed.

Next, in reference to FIG. 8, the purchase procedure executed in a case where the card ID not linked with the user ID is used will be described. However, to parts common to parts in FIG. 7, the same step numbers are assigned respectively. Hereinafter, different points will be mainly described. In a case where the card ID which is not linked with the user ID is noticed from the charge machine 7, it is impossible for the user managing portion 23 to obtain the user ID at step S103. In this case, the user managing portion 23 generates automatically a user ID and a user password code as the verification information of the second service, and records the user ID and the user password code in the data 21 of user information (step S131). Further, the user managing portion 23 records in the data D22 of linking information, information indicating that the user ID generated and the card ID designated at step S102 are linked with each other (step S132). Further, with respect to the data D23 of usage setting information, the user managing portion 23 sets the usage setting information corresponding to the user ID generated at step S131 (step S133). Further, the user managing portion 23 records in the data D24 of provisional registration information, information indicating that the user ID generated is a user ID provisionally registered (step S134). That is, the user ID which is generated at step S131 in FIG. 8 is a provisionally registered user ID which is not associated with the personal information inputted by the user. The user ID and the user password code generated at step S131 are internal information of the center server 2 and kept secret without being noticed to the user. However, the user ID may be disclosed to the user exceptionally in a case where a predetermined condition is satisfied. On the other hand, the user password code is completely kept secret from the user, not disclosed exceptionally.

After the provisionally registered user ID is set, the user managing portion 23 notices the user ID, the state of usage setting information, and the information of registration state, to the card managing portion 21, as with the case of FIG. 7 (steps S106 to S108). In this case, it is noticed to the card managing portion 21 that the state of usage setting information is ON and the user ID is in a provisional registration state. When it is noticed that the state of usage setting information is ON from the card managing portion 21 to the charge machine 7, thereafter, the purchase processing of virtual currency goes on by following the procedure of steps S111 to S122. However, in this case, the user ID has not yet been recorded in the data D41 of balance information. Due to this, at step S115, the user ID is recorded and zero is recorded as the balance of virtual currency associated with the user ID. In this case, a predetermined balance may be recorded as a privilege caused by the first use of virtual currency.

In short, the above mentioned processing executed by the user managing portion 23 in FIGS. 7 and 8 diverges depending on whether the user ID associated with the card ID exists or not by referring to the data D22 of linking information. Accordingly, the processing procedure of FIGS. 7 and 8 executed by the user managing portion 23 can be represented by a flowchart of user ID generating process shown in FIG. 9. With respect to the processing of FIG. 9, a step number corresponding to a step number in FIG. 7 or FIG. 8 is assigned to each step, and the description of each step is omitted.

Figure 9:
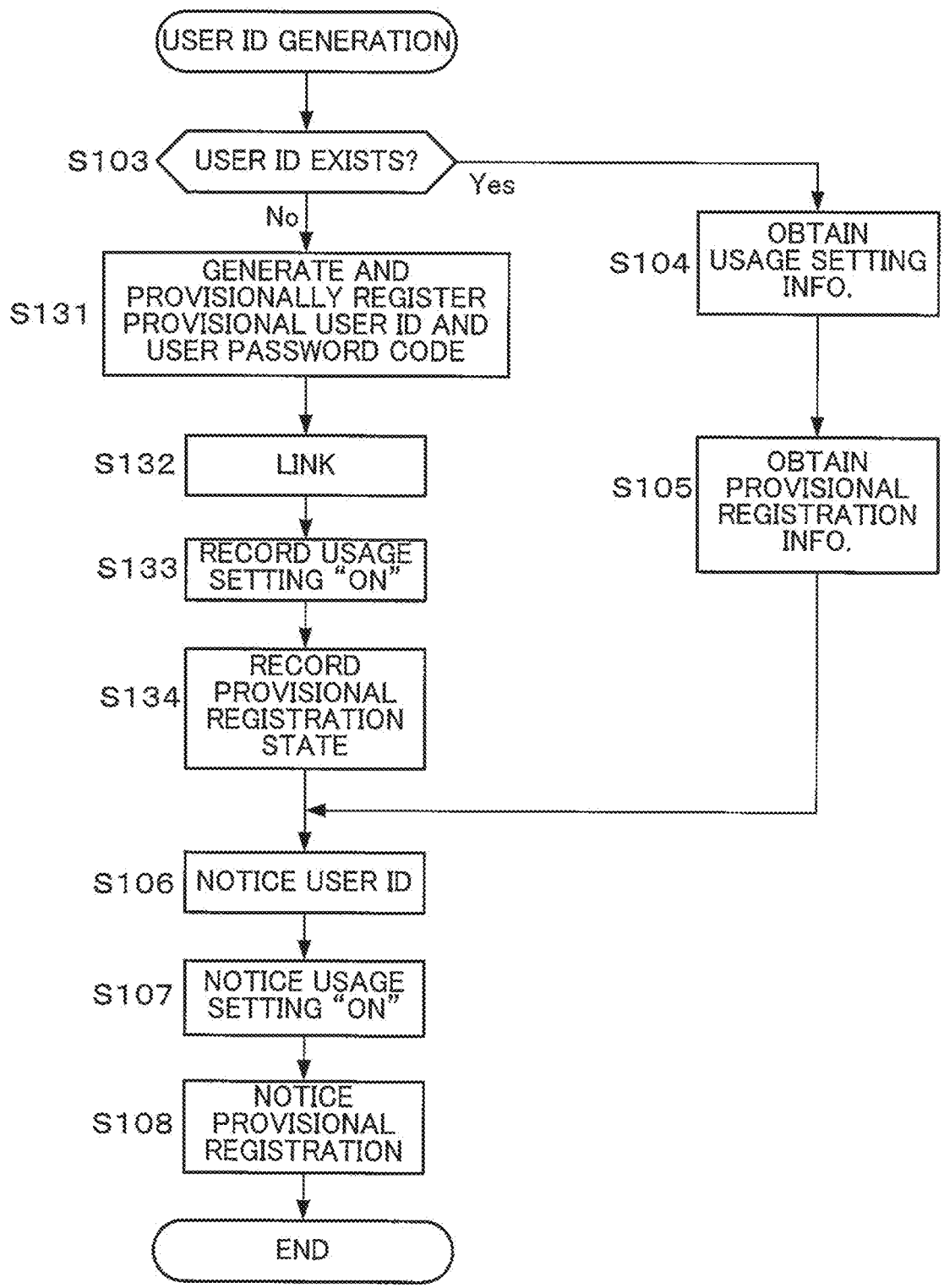
FIG. 9 is a flowchart expressing processing procedure of a user managing portion in FIGS. 7 and 8 in chronological order.

As mentioned above, according to the processing procedure shown in FIGS. 8 and 9, in a case where the user ID linked with the card ID does not exist, the center server 2 generates a user ID and a user password code as internal processing and likes the user ID link with the card ID, without input of personal information by the user. Accordingly, thereafter, even if the user ID is in a provisional registration state, it is possible to manage the balance of virtual currency associated with the user ID, and also it becomes possible to specify the balance of virtual currency associated with the user ID by designation of the card ID. Accordingly, at the charge machine 7, the user is allowed to purchase the virtual currency by designating the cased ID and the card password code to verify the card 8. And also, at the game machine 3, the user is allowed to pay the counter value of the first service by consumption of the virtual currency, by designating the card ID and the card password code to verify the card 8. On the other hand, even if the user wants to use the second service with the user terminal apparatus 4, the user cannot acquire the verification for which a user ID of the provisional registration state is used. Because, at least the user password code within the user ID and the user password code which have been generated at step S131 in FIGS. 8 and 9 is not at all disclosed to the user. Accordingly, it is impossible for the user to use the second service without registering his/her personal information. Naturally, it is also impossible for the user to pay the counter value of the second service by consumption of virtual currency. Thereby, even if a user ID which is not associated with personal information is generated, the security level is not lowered with respect to the second service. Further, since it is necessary to make the game machine 3 obtain the card ID and the card password code in order to consume the virtual currency associated with the user ID of provisional registration state, as long as the user keeps at least any one of the card ID and the card password code secret from someone, it cannot happen that the virtual currency of the user is used by the other user of the game machine 3 despite the intention of the user. Further, in a state that the user ID is provisionally registered, the user is allowed to purchase the virtual currency to increase the balance only when paying the purchase charge by cash with the charge machine 7. In this case, any other purchase means is not prepared.

Figure 10:
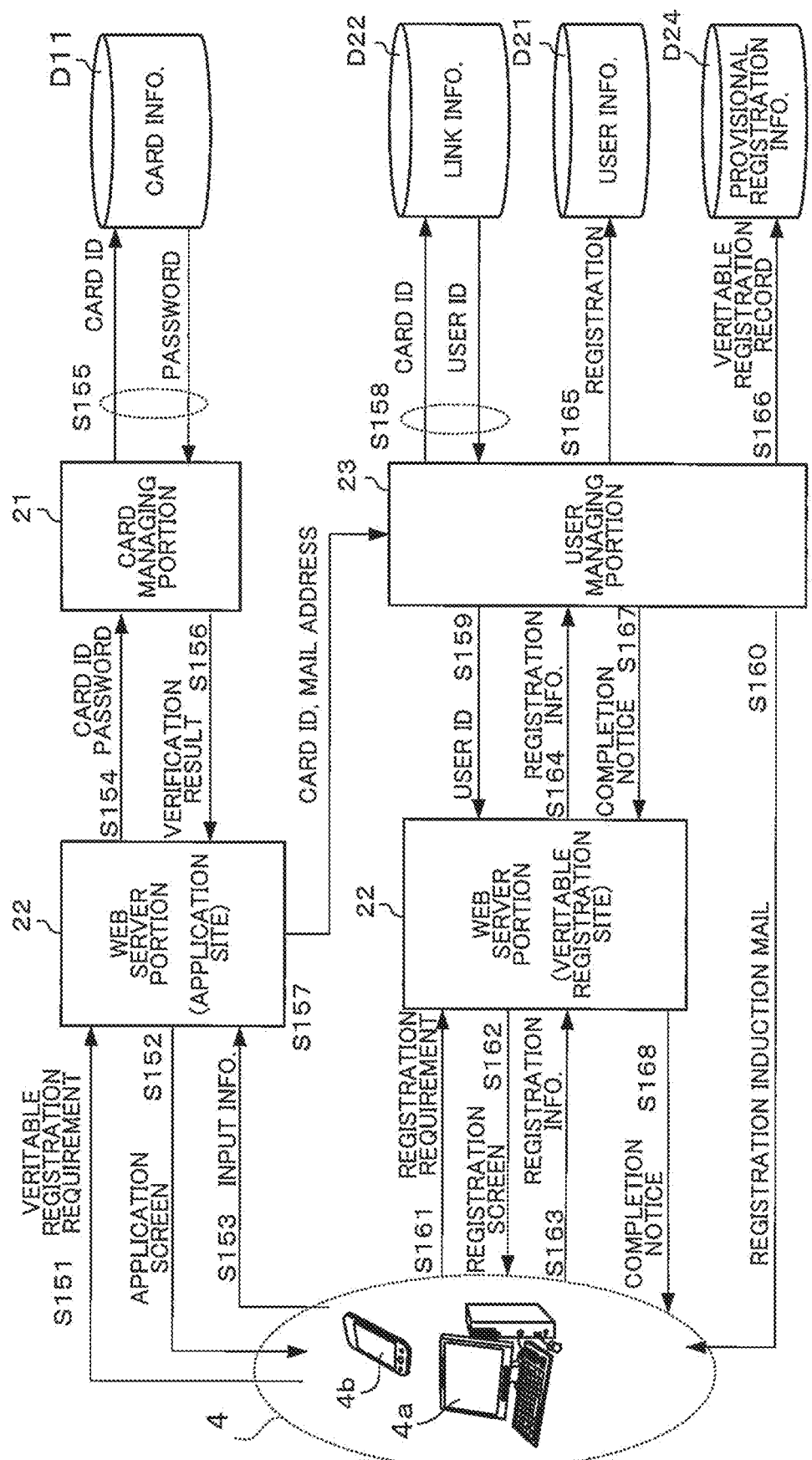
FIG. 10 is a diagram showing processing procedure to be executed for switching a state of the user ID from a provisional registration state to a veritable registration state where a user ID is associated with the personal information.

As mentioned above, even if the user ID is in the provisional registration state, the user is allowed to use the virtual currency within a range of the first service which is served through the verification for which the card ID is used. However, in a state that the user ID is in the provisional registration state, the user is not allowed to use the second service. On the other hand, in a case where, in order to use the second service, the user registers his/her personal information by following the procedure of FIG. 4 and obtains his/her user ID newly, the user is not allowed to use, by the user ID obtained newly, the balance of virtual currency recorded in association with the provisionally-registered user ID. Therefore, in the center server 2, prepared is some processing for making a user ID provisionally registered switch to a user ID veritably registered, on condition of registration of the personal information of the user. FIG. 10 shows one example of processing procedure which is executed for switching the registration state of the user ID.

As shown in FIG. 10, the Web server portion 22 publishes on the network 5, an application site which accepts applications for switching to the veritable registration, and a site for veritable registration, and the user can access those sites from the user terminal apparatus 4. The user may be induced to the application site in such appropriate ways that an object to be linked with the application site is disposed on an appropriate site which the Web server portion 22 allows the user to use without the user verification, 2-dimensional bar code, in which the URL of the application site is put, is displayed at the charge machine 7 or the game machine 3, or the like.

Figure 11:
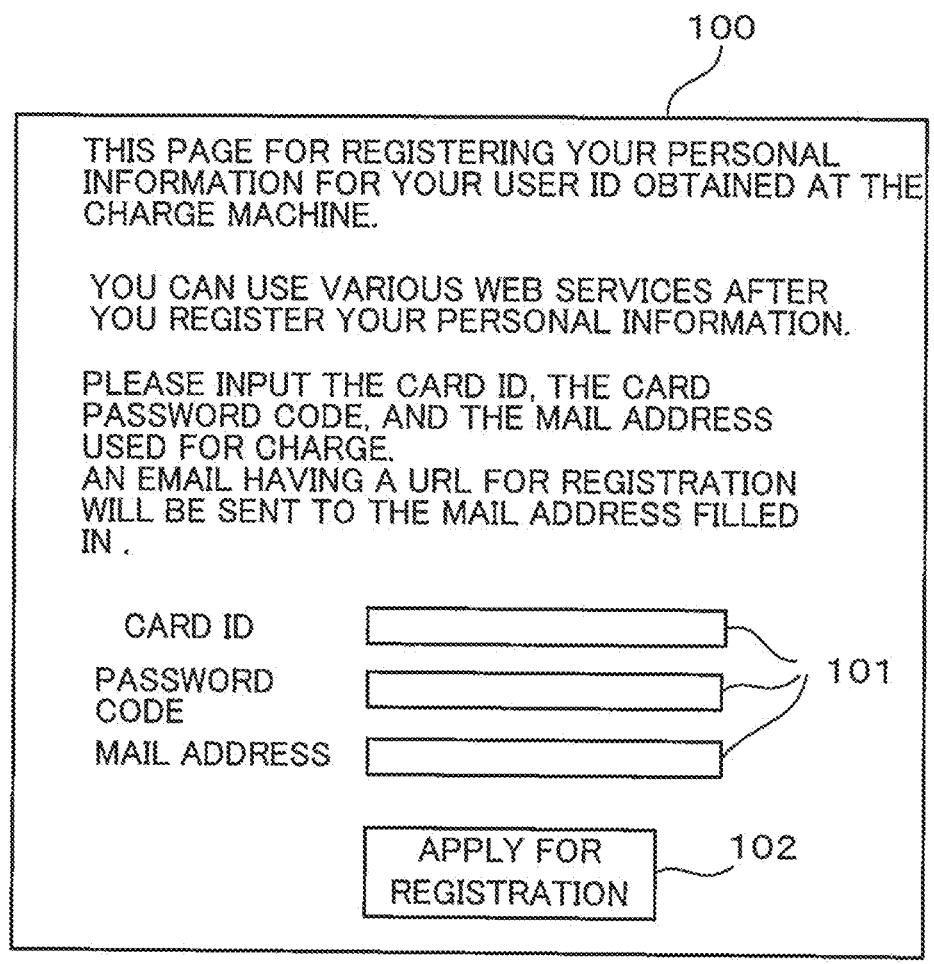
FIG. 11 is a diagram showing one example of an application screen to be displayed in order to switch a state of the user ID from the provisional registration state to the veritable registration state.

When the user accesses the application site to require the veritable registration (step S151), the Web server portion 22 transmits to the user terminal device 4, data of an application screen which is used for obtaining information necessary for the application (step S152). One example of the application screen is shown in FIG. 11. In the application screen 100 of FIG. 11, as one example of the information necessary for application, the card ID and the card password code which were used when the user purchased the virtual currency at the charge machine 7 and an e-mail address (a mail address) which the user can receive are set. In the screen 100, entry boxes 101 for the necessary information and a registration application button 102 are included. When the user inputs the information in the entry boxes 101 and clicks the application button 102, as shown in FIG. 10, inputted information of the user is transmitted to the Web server portion 22 (step S153).

When receiving the inputted information including the card ID and the like from the user terminal apparatus 4, the Web server portion 22 requires, with designating the card ID and the card password code included in the inputted information, the card managing portion 21 to verify the card 8 (step S154). The card managing portion 21 obtains from the data D11 of card information, the card password code associated with the card ID designated, checks the card password code from the data D11 against the card password code obtained from the user terminal apparatus 4 to verify the card 8 (step S155), and notices the verification result to the Web server portion 22 (step S156). When confirming completion of the verification, the Web server portion 22 requires, with designating the cared ID and the mail address obtained by the user terminal apparatus 4, the user managing portion 23 to specify the user ID and transmit an email for inducing the user to the site for veritable registration (step S157).

In response to the requirement of step S157, the user managing portion 23 obtains from the data D22 of linking information, the user ID corresponding to the card ID obtained from the Web server portion 22 (step S158), and notices the user ID obtained to the Web server portion 22 (step S159). Further, in response to the request of step S157, the user managing portion 23 emails a registration induction where the URL of the site for veritable registration is indicated to the mail address designated by the user (step S160). Here, the URL indicated here is different for each user ID obtained at step S158. The URL may be shown as a clickable object in the email. At the user terminal apparatus 4, when the user obtains the email and instructs to access the URL shown in the email, it is required to register the personal information to the Web server portion 22 from the user terminal apparatus 4 (step S161). The Web server portion 22 transmits to the user terminal apparatus 4, the data of the registration screen for obtaining from the user the personal information necessary for veritable registration (step S162). The data transmitted here is a screen specifically for a user which is different for each user ID obtained at step S159. That is, the URL of the site for veritable registration is set so that the data of registration screen associated with each user ID is served.

One example of registration screen obtained based on the data served at step S162 is shown in FIG. 12. In the registration screen 110 of FIG. 12, included is a display box 111 of the user ID which the Web server portion 22 obtained at step S159. That is, in the processing for displaying the screen for veritable registration, the user ID provisionally registered is disclosed to the user. In this state, when the user cancels the veritable registration, the user ID provisionally registered has got known by the user. However, the user password code which is one of verification information necessary for using the second service is not disclosed to the user. Accordingly, even if the user ID gets known, it is impossible for the user to acquire the verification for the second service. Also, the following embodiment may be applied. In the display box 111 of the registration screen 110, at least a part of the user ID is hidden, and after completion of the veritable registration, the user ID is noticed to the user by using the Web page, the email, of the like.

In the registration screen 110 of FIG. 12, further served are input boxes 112 for various kinds of information such as the card ID, the birth date, the user password code. The card ID may be omitted. The user password code is not the user password code automatically generated at step S131 of FIGS. 8 and 9, and the user can designate an arbitrary password code. Here, in order to keep a security level at a certain level or more, with respect to the user password code which can be designated here, some requirements may be set, for example, the user password code must have a certain number of digits or more, and/or must be made by a combination of numerals and English letters. When the user fills in the input boxes 112 and clicks the registration button 113, as shown in FIG. 10, the inputted information of the user is transmitted to the Web server portion 22 as the registration information (step S163).

When obtaining the registration information from the user terminal apparatus 4, the Web server portion 22 serves the registration information to the user managing portion 23, and requires the user managing portion 23 to register the registration information in the data D21 of user information (step S164). In response to the requirement, the user managing portion 23 registers the personal information of the user in association with the user ID included in the registration information in the data D21 (step S165). At this moment, the user password code registered in the data D21 at step S131 of FIGS. 8 and 9 is overwritten by the user password code transmitted at step S163. Thereby, the user gets to know both of the user ID and the user password code. Thereafter, the user can acquire the verification of himself/herself by designating the user ID and the user password code, and thereby it is possible for the user to use the second service.

When completing the registration of the data 21 of user information, it should be understood that the state of the user ID, an operation object of this time, is switched from the provisional registration state to the veritable registration state. Accordingly, the user managing portion 23 records in the data D24 of provisional registration information, information indicating that the user ID, the operation object of this time, is veritably registered (step S166). After the completion of step S166, the user managing portion 23 notices the completion of switching the registration state of the user ID to the Web server portion 22 (step S167). The Web server portion 22 notices the completion to the user terminal apparatus 4 (step S168). Thus, the processing necessary for switching to the veritable registration is completed.

In the game system 1 of the present embodiment, in a state that the user ID is provisionally registered, it is impossible for a user to acquire user verification using his/her user ID. Therefore, there are limitations such that the user cannot use the second service associated with the user ID and cannot consume virtual currency as the counter value of the second service. The existence of such limitations could course to motivate the user to switch the state of his/her user ID from the provisional registration state to the veritable registration state, that is, to register his/her personal information.

Figure 13:
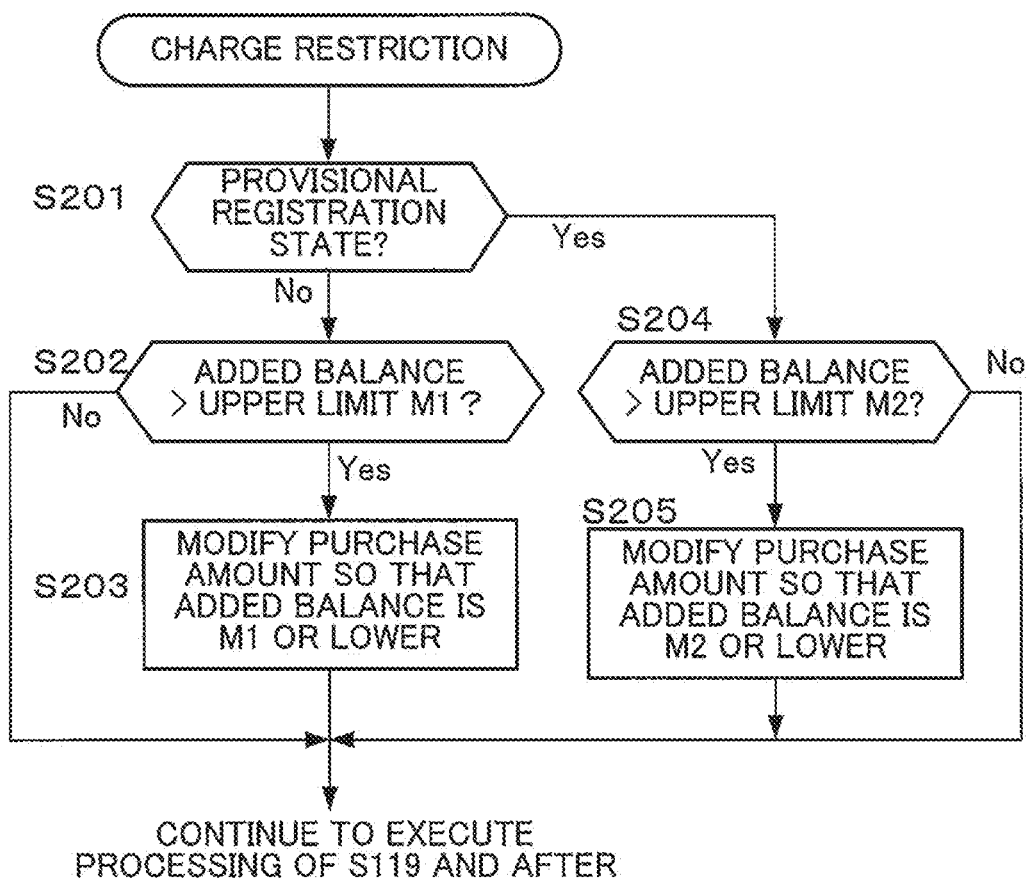
FIG. 13 is a flowchart showing procedure of charge restriction processing executed by a charge managing portion.

Next, in reference to FIG. 13, one example of use application of information recorded in the data D24 of provisional registration information will be described. FIG. 13 shows processing procedure of charge restriction processing which is executed by the charge managing portion 24 in order to impose a predetermined restriction, with respect to use of virtual currency at time when the user ID is in the provisional registration state, in comparison with time when the user ID is in the veritably registration state. It should be understood that the processing of FIG. 13 should be executed as a part of the procedures shown in FIGS. 7 and 8, each being executed by the charge managing portion 24. Therefore, the same step number is assigned to each of parts which are duplicated with the parts in the procedures shown FIGS. 7 and 8.

In the processing of FIG. 13, the charge managing portion 24 determines whether the user ID is in the provisional registration state or not, by referring to the information indicating the registration state of the user ID obtained from the card managing portion 21 (step S201). In a case that the user ID is not in the provisional registration state, in other words, in a case that the user ID is in the veritable registration state, the charge managing portion 24 determines whether a value is bigger than a predetermined upper limit M1 (step S202), the value being obtained by adding the purchase amount designated by the charge machine 7 to the current balance of virtual currency (hereinafter, this value is sometimes referred to as "the added balance".). In a case of the added balance exceeding the upper limit M1, the charge managing portion 24 modifies the purchase amount so that the added balance is equal to or lower than the upper limit M1 (step S203). On the other hand, in a case where the user ID in the provisional registration state, the charge managing portion 24 determines whether the added balance exceeds a predetermined upper limit M2 (step S204). In a case of the added balance exceeding the upper limit M2, the charge managing portion 24 modifies the purchase amount so that the added balance is equal to or lower than the upper limit M2 (step S205). The upper limits M1 and M2 are the maximum amounts of balance of virtual currency respectively. The maximum amount of balance of virtual currency at time when the user ID is in the provisional registration state is restricted so as to be smaller than the maximum amount of the veritable registration state. That is, the upper limit M2 is smaller than the upper limit M1. Further, at time when the purchase amount is modified at step S203 or S205, user's agreement may be required.

After the purchase amount is modified at step S203 or step S205, the charge managing portion 24 goes to the processing of step S119 and after in each of FIG. 7 and FIG. 8. In a case where a negative determination is obtained at step S202 or step S204, the charge managing portion 24 skips step S203 or step S205 respectively, and goes to step S119.

According to the above mentioned charge restriction processing, in a case where the user ID is in the provisional registration state, the maximum amount of balance of virtual currency which a user is allowed to hold is restricted so as to be smaller than the maximum amount of balance at time when the user ID veritably registered is used. By setting such a restriction, it is possible to give a user a stronger motivation for making the user register his/her personal registration. Further, it is possible to further decrease a risk occurring by allowing a user to use virtual currency without registration of personal information.

In the case of FIG. 13, the upper limits M1 and M2 of virtual currency which allow the addition are set as the maximum amount of balance of virtual currency. However, instead of or in addition to this, by setting an upper limit of purchase amount per purchase as the upper limit of virtual currency which allow the addition, the purchase amount per purchase with respect to a user ID of the provisional registration state may be restricted so as to be smaller than the purchase amount per purchase with respect to a user ID of the veritable registration state. In this way, in a case where the upper limits of purchase amount per purchase are differentiated from each other, it is also possible to give a user a motivation of the veritable registration, and also it is possible to further decrease a risk occurring by allowing the user to use virtual currency without registration of his/her personal information.

Figure 14:
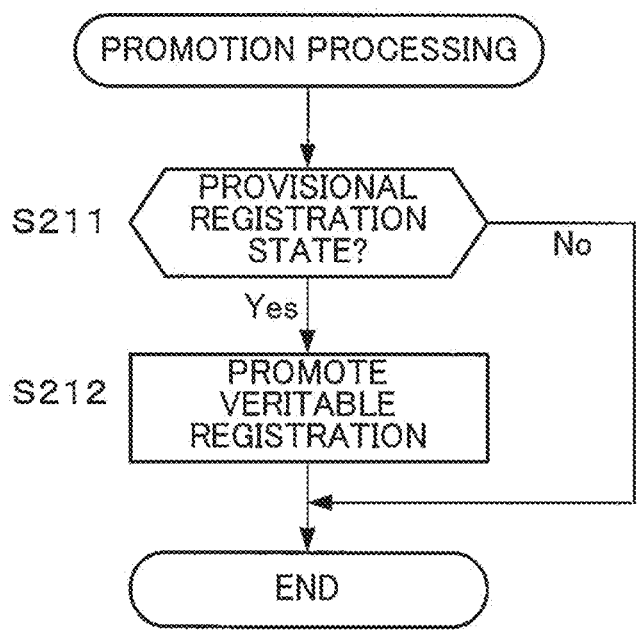
FIG. 14 is a flowchart showing promotion processing executed by the charge managing portion.

Further, in order to give a user the motivation for registering his/her personal information, the veritable registration may be promoted to the user when the virtual currency associated with the user ID of the provisional registration state is used. For example, when the balance of virtual currency is increased, or the virtual currency is consumed, the charge managing portion 24 starts promotion processing shown in FIG. 14. First, the charge managing portion 24 determines whether the user ID is in the provisional registration state or not based on information of the registration information obtained from the data D24 of provisional registration information (step S211). In a case of the provisional registration state, a message for promotion of the veritable registration is noticed to the user via the charge machine 7 or the game machine 3 (step S212). On the other hand, the information for determining whether the user ID is in the provisional registration state or not may be served to the charge machine 7 or the game machine 3, and the processing of FIGS. 13 and 14 may be executed at the charge machine 7 or the game machine 3.

In the above embodiment, the user managing portion 23 manages the data D22 of linking information in association with a user ID, and the user managing portion 23 links a card ID with a user ID in response to a requirement from a user. The card managing portion 21 may manage the data D22 of linking information, and may link a card ID with a user ID in response to a requirement from a user. Also, with respect to the data D23 of usage setting information, instead of the user managing portion 23, the card managing portion 21 may manage the data D23. In this case, the card managing portion 21 controls whether the usage setting state is ON or OFF according to an instruction from a user, and thereby, it is possible to set whether the virtual currency is used or not, for each card ID, in other words, for each card 8. Besides, the configuration shown in FIG. 2 is just one example. The logical devices 21 to 25 may be appropriately integrated, or separated from each other. Also, the data D11, the data D12, the data D21 to D24, the data D31, and the data D41 may be configured and arranged as appropriate.

If each embodiment of the present invention is explained with reference symbols and the like in parentheses used in attached drawings which were referred to in the above embodiment, the explanation is as follows. A network system (1) as one aspect of the present invention is a network system comprising a server apparatus (2) and a plurality of terminal apparatuses (3, 4, 7) connected with the server apparatus via a network (5), each of the plurality of terminal apparatuses obtaining from a user and serving to the server apparatus, at least any one of a first verification information (as one example, a card ID and a card password code) including a first identification information (as one example, a card ID) set to a medium (8) owned by the user uniquely for each medium; and a second verification information including a second identification information (as one example, a user ID) and at least a part of personal information of the user (as one example, a user password code), the second identification information being set uniquely for each user and associated with the personal information of the user, wherein the server apparatus has a computer which, by executing a computer program, functions as: a first service serving device (21) which is configured to serve to the user a first service (as one example, a service of serving to the terminal apparatus or store, game-play data D12) based on data associated with the first identification information on condition that the first verification information is obtained from the terminal apparatus and the medium is verified; a second service serving device (22, 23) which is configured to serve to the user a second service based on data associated with the second identification information on condition that the second verification information is obtained from the terminal apparatus and the user is verified; an identification information linking device (23, S37) which is configured to link the first identification information and the second identification information with each other based on a requirement from the user via the terminal apparatus; a value managing device (24, 25, S55, S56, S78, S79, S119, S120) which is configured to store an amount of electronic value in association with the second identification information, the amount of electronic value being consumed as counter value of either the first service or the second service, and increase the amount of electronic value associated with the second identification information depending on a purchase amount of the user, in response to a purchase requirement from the terminal apparatus, the purchase requirement designating the second identification information or the first identification information being linked with the second identification information, while decreasing the amount of electronic value associated with the second identification information depending on the counter value to be consumed by the user, in response to a consumption requirement from the terminal apparatus, the consumption requirement designating the second identification information or the first identification information being linked with the second identification information; a correlation determining device (23, S103) which is configured to determine, in a case where use of electronic value is required with designation of the first identification information, from the terminal apparatus, whether the second identification information linked with the first identification information exists or not; and an identification information generating device (23, S131, S132) which is configured to, in a case where the correlation determining device determines that the second identification information linked with the first identification information does not exist, generate a provisional second identification information (as one example, a user ID of the provisional registration state) which is not associated with the personal information, and link the provisional second identification information and the first identification information with each other.

A server apparatus (2) as one aspect of the present invention is a server apparatus being connected to a plurality of terminal apparatuses (3, 4, 7) via a network (5), each of the plurality of terminal apparatuses obtaining from a user and serving to the server apparatus, at least any one of a first verification information (as one example, a card ID and a card password code) including a first identification information (as one example, a card ID) set to a medium (8) owned by the user uniquely for each medium; and a second verification information including a second identification information (as one example, a user ID) and at least a part of personal information of the user (as one example, a user password code), the second identification information being set uniquely for each user and associated with the personal information of the user, wherein the server apparatus has a computer which, by executing a computer program, functions as: a first service serving device (21) which is configured to serve to the user a first service(as one example, a service of serving to the terminal apparatus or store, gameplay data D12) based on data associated with the first identification information on condition that the first verification information is obtained from the terminal apparatus and the medium is verified; a second service serving device (22, 23) which is configured to serve to the user a second service based on data associated with the second identification information on condition that the second verification information is obtained from the terminal apparatus and the user is verified; an identification information linking device (23, S37) which is configured to link the first identification information and the second identification information with each other based on a requirement from the user via the terminal apparatus; a value managing device (24, 25, S55, S56, S78, S79, S119, S120) which is configured to store an amount of electronic value in association with the second identification information, the amount of electronic value being consumed as counter value of either the first service or the second service, and increase the amount of electronic value associated with the second identification information depending on a purchase amount of the user, in response to a purchase requirement from the terminal apparatus, the purchase requirement designating the second identification information or the first identification information being linked with the second identification information, while decreasing the amount of electronic value associated with the second identification information depending on the counter value to be consumed by the user, in response to a consumption requirement from the terminal apparatus, the consumption requirement designating the second identification information or the first identification information being linked with the second identification information; a correlation determining device (23, S103) which is configured to determine, in a case where use of electronic value is required with designation of the first identification information, from the terminal apparatus, whether the second identification information linked with the first identification information exists or not; and an identification information generating device (23, S131, S132) which is configured to, in a case where the correlation determining device determines that the second identification information linked with the first identification information does not exist, generate a provisional second identification information (as one example, a user ID of the provisional registration state) which is not associated with the personal information, and link the provisional second identification information and the first identification information with each other.

A Server apparatus control method as one aspect of the present invention is a server apparatus control method being applied to a server apparatus (2) connected to a plurality of terminal apparatuses (3, 4, 7)via a network (5), each of the plurality of terminal apparatuses obtaining from a user and serving to the server apparatus, at least any one of a first verification information (as one example, a card ID and a card password code) including a first identification information (as one example, a card ID) set to a medium (8) owned by the user uniquely for each medium; and a second verification information including a second identification information (as one example, a user ID) and at least a part of personal information of the user (as one example, a user password code), the second identification information being set uniquely for each user and associated with the personal information of the user, and the server apparatus having a computer which, by executing a computer program, functions as: a first service serving device (21) which is configured to serve to the user a first service (as one example, a service of serving to the terminal apparatus or store, gameplay data D12) based on data associated with the first identification information on condition that the first verification information is obtained from the terminal apparatus and the medium is verified; a second service serving device (22, 23) which is configured to serve to the user a second service based on data associated with the second identification information on condition that the second verification information is obtained from the terminal apparatus and the user is verified; an identification information linking device (23, S37) which is configured to link the first identification information and the second identification information with each other based on a requirement from the user via the terminal apparatus; and a value managing device (24, 25, S55, S56, S78, S79, S 119, S120) which is configured to store an amount of electronic value in association with the second identification information, the amount of electronic value being consumed as counter value of either the first service or the second service, and increase the amount of electronic value associated with the second identification information depending on a purchase amount of the user, in response to a purchase requirement from the terminal apparatus, the purchase requirement designating the second identification information or the first identification information being linked with the second identification information, while decreasing the amount of electronic value associated with the second identification information depending on the counter value to be consumed by the user, in response to a consumption requirement from the terminal apparatus, the consumption requirement designating the second identification information or the first identification information being linked with the second identification information, wherein the server apparatus control method includes: a step of determining (S103), in a case where use of electronic value is required with designation of the first identification information, from the terminal apparatus, whether the second identification information linked with the first identification information exists or not; and a step of generating (S131, S132) in a case where the step of determining determines the second identification information linked with the first identification information does not exist, a provisional second identification information (as one example, a user ID of the provisional registration state) which is not associated with the personal information, and linking the provisional second identification information and the first identification information with each other.

A non-transitory computer readable storage medium as one aspect of the present invention is a non-transitory computer readable storage medium storing a computer program of a server apparatus (2) having a computer, the server apparatus being connected to a plurality of terminal apparatuses (3, 4, 7) via a network (5), each of the plurality of terminal apparatuses obtaining from a user and serving to the server apparatus, at least any one of a first verification information (as one example, a card ID and a card password code) including a first identification information (as one example, a card ID) set to a medium (8) owned by the user uniquely for each medium; and a second verification information including a second identification information (as one example, a user ID) and at least a part of personal information of the user (as one example, a user password code), the second identification information being set uniquely for each user and associated with the personal information of the user, wherein the computer program is configured so as to make the computer function as: a first service serving device (21) which is configured to serve to the user a first service (as one example, a service of serving to the terminal apparatus or store, game-play data D12) based on data associated with the first identification information on condition that the first verification information is obtained from the terminal apparatus and the medium is verified; a second service serving device (22, 23) which is configured to serve to the user a second service based on data associated with the second identification information on condition that the second verification information is obtained from the terminal apparatus and the user is verified; an identification information linking device (23, S37) which is configured to link the first identification information and the second identification information with each other based on a requirement from the user via the terminal apparatus; a value managing device (24, 25, S55, S56, S78, S79, S119, S120) which is configured to store an amount of electronic value in association with the second identification information, the amount of electronic value being consumed as counter value of either the first service or the second service, and increase the amount of electronic value associated with the second identification information depending on a purchase amount of the user, in response to a purchase requirement from the terminal apparatus, the purchase requirement designating the second identification information or the first identification information being linked with the second identification information, while decreasing the amount of electronic value associated with the second identification information depending on the counter value to be consumed by the user, in response to a consumption requirement from the terminal apparatus, the consumption requirement designating the second identification information or the first identification information being linked with the second identification information; a correlation determining device (23, S103) which is configured to determine, in a case where use of electronic value is required with designation of the first identification information, from the terminal apparatus, whether the second identification information linked with the first identification information exists or not; and an identification information generating device (23, S131, S132) which is configured to, in a case where the correlation determining device determines that the second identification information linked with the first identification information does not exist, generate a provisional second identification information which is not associated with the personal information, and link the provisional second identification information and the first identification information with each other.

In the present invention, the personal information of a user means information relating to the user himself/herself and also required to be registered in order to allow the user to obtain the second identification information. For example, information such as name, birth date, address can be the personal information. However, the personal information is not limited to such information, and may include various kinds of information which should be associated with the user himself/herself, such as a password code especially for the user, the password code being set by the user himself/herself, or being issued by the server apparatus to the user. Any information will work as the second verification information, as long as including the second identification information and at least a part of the personal information. On the other hand, any information will work as the first verification information, as long as including the first identification information. Due to this, only the first identification information may be employed as the first verification information.

In the present invention, a service based on data associated with the first identification information will work as the first service, and a service based on data associated with the second identification information will work as the second service. The service based on data may include any appropriate embodiments of services, such as a service of executing some processing by referring to the data, a service of modifying the data itself, and a service of serving the data. In the present invention, the term "provisional" with respect to the second identification information is used to indicate a state that the second identification information is not associated with the personal information, and to discriminate the second identification information of such a state from the second identification information associated with the personal information. Even if the second identification information is provisional, the provisional second identification information is possible to be stored in association with the amount of electronic value (for example, a balance). Further, since the "provisional second identification information" is linked with the first identification information, it is possible to specify the amount of electronic value owned by the user by using the correlation between the first identification information and the second identification information, and possible to add or subtract with respect to the amount. It is completed to associate the second identification information and the personal information with each other, when all items of information set as indispensable condition for the user to obtain the second identification are registered. For example, in the above embodiment, not only the user ID as the second identification information but also the user password code which should be a part of the personal information are generated automatically, and the personal information is recorded in the data D21 of user information in association with the user ID. However, it should be understood that, as long as any other personal information which is incredible for obtaining a user ID does not exist, the user ID is provisional one, and is distinguished from a user ID associated with the personal information.

The present invention is possible to include the following embodiment. The computer may further function as a registration switching device (21, 22, 23, S151 to S166) which is configured to, in a case where a registration of the personal information is required from the terminal apparatus with designation of the first identification information, obtain the personal information of the user corresponding to the provisional second identification information from the terminal apparatus, and store the personal information in association with the provisional second identification information, so that the provisional second identification information is switched to the second identification information associated with the personal information of the user. Thereby, the provisional second identification information is switched to the second identification information associated with the personal information, and the verification of the user by using the second verification information is enabled.

Further, in the above embodiment, the second identification information may be kept hidden to the user as long as processing by the registration switching device does not proceed to a predetermined step.

Further, the computer may further function as a promoting device (24, S211, S212) which is configured to notice information for promotion of registration of the personal information via the terminal apparatus to the user corresponding to the provisional second identification information.

In one of embodiments of the present invention, a predetermined restriction may be set, with respect to use of the electronic value with designation of the first identification information linked with the provisional second identification information, in comparison with use of electronic value with designation of the second identification information associated with the personal information or the first identification information linked with the second identification information.

The predetermined restriction may be set in association with an addition requirement of the electronic value from the terminal apparatus with designating the first identification information linked with the provisional second identification information. In this case, a state such that the addition is enabled, or the addition is restricted is made to occur.

In the embodiment where a predetermined restriction is set with respect to the addition requirement, the plurality of terminal apparatuses may include a terminal apparatus for addition (7) which is configured to transmit to the server apparatus on condition of payment of purchase charge by the user, the addition requirement of electronic value corresponding to a purchase amount depending on amount paid by the user with designating the first identification information obtained from the user, and the predetermined restriction may be set so that the addition of electric value is enabled only when the user uses the terminal apparatus for addition to pay the purchase charge.

Further, the predetermined limitation may be set so that the addition of the electronic value is enabled only when the purchase charge is paid by cash.

Alternatively, the predetermined restriction may be set so that an upper limit of electronic value which allows addition by an addition requirement designating the first identification information associated with the provisional second identification information is smaller than an upper limit of electronic value which allows addition by an addition requirement of electronic value designating the second identification information associated with the personal information or the first identification information linked with the second identification information. According to this embodiment, the amount of electronic value which the user can purchase is made comparatively small.

On the other hand, the predetermined restriction may be set in association with a consumption requirement of the electronic value with designation of the first identification information linked with the provisional second identification information.

Further, the predetermined restriction may be set so that processing for decreasing an amount of the electronic vale in response to the consumption requirement designating the first identification information is executed only when the user uses the first service via a specific terminal apparatus. According to this embodiment, the use of electronic value is allowed only via a specific terminal apparatus.

In one of embodiments of the present invention, the plurality of terminal apparatuses includes a terminal apparatus for business (3) which is configured to obtain the first identification information from the user and serves the first identification information to the server apparatus, and allows the user, on condition of payment of the counter value of the first service, to use the first service within a range corresponding to the counter value, and the first service serving device may be configured to serve as the first service a service that data (D12) associated with the first identification information is served to the terminal apparatus for business, and also data updated depending on use of the terminal apparatus for business is stored in association with the first identification information.

In the above embodiment, a game machine for business (3) may be provided as the terminal apparatus for business, and the first service serving device may be configured to serve to the game machine for business, game-play data (D12) where a game-play content performed by the user at the game machine for business is stored, as the data associated with the first identification information.

Further, the second service serving device may be configured to serve as the second service to the user via the terminal apparatus, a service associated with a game which is played at the game machine for business.

In the above explanation, each embodiment of the present invention is explained while using one embodiment of the present invention shown FIGS. 1 to 14. However, the present invention is not limited to the illustrated embodiment. The present invention is possible to be executed in various embodiments. For example, in the above embodiments, the provisionally registered user ID is hidden as long as the user does not proceed to the registration screen 100, and the user password code is completely kept hidden to the user. Thereby, the user does not acquire the user verification for the second service. However, in a case where the provisionally registered user ID is kept hidden as long as the veritable registration is not completed, it is not necessary that the user password code is generated at step S131. Alternatively, in a case where the verification condition is set so that the user verification is not completed when the user password code does not exist, it is not necessary that the user password code is generated and registered in the data D21 of user information at step S131.

In the above embodiment, the purchase of virtual currency by the charge machine 7 is allowed only when paid by cash. Therefore, even when the virtual currency is purchased with designation of the provisional user ID provisionally registered, eventually, the purchase is limited to payment by cash. In a case where there is a terminal apparatus which allows a user to use any settlement means other than cash, it is possible to limit the settlement means for the purchase of virtual currency to payment by cash, if the terminal apparatus is controlled so that: when the virtual currency is purchased with designation of the card ID, it is determined whether the user ID is in the provisional registration state or not based on the data D24 of provisional registration information, and in a case of the provisional registration state, the settlement means other than cash is enabled at the terminal apparatus. Further, in a case where the user ID is in the provisional registration state, even when it is controlled depending on the kind of settlement means whether the purchase is allowed or not, so that while the user is allowed to purchase electronic value by an electronic settlement means which does not require the user to input or designate any security information in addition to cash, a user is forbidden to use a settlement means whose security level is enhanced by requiring the user to input security information (as one example, the security code) like a credit card, it may be determined also by using the data D24 of provisional registration information whether the purchase is allowed or not. In a case where there are plural terminal apparatuses where the purchase of virtual currency is enabled, and the purchase of virtual currency with respect to the user ID of the provisional registration state is enabled only at some specific ones of the terminal apparatuses, the operations of the terminal apparatuses may be controlled in such a way that at time of the purchase, it is determined based on the data D24 of provisional registration information whether the user ID is in the provisional registration state or not, and in a case of the provisional registration state, the purchase is forbidden at the terminal apparatuses other than the specific ones. Also, with respect to the consumption of virtual currency, in a similar way, it is possible to control the terminal apparatuses so that the consumption is enabled only at a specific terminal apparatus (for example, only at the game machine 3). As one example, in a case where a user purchases virtual currency using the card ID, the data D24 of provisional registration information linked with the card ID is used as a part of the verification information. And, if executed is such control that when the user ID is the one provisionally registered, the verification is denied at the terminal apparatuses except the charge machine 7 the user cannot purchase the virtual currency at the terminal apparatuses except the charge machine 7. Concerning the consumption of the virtual currency, by using the data D24 of provisional registration information as a part of verification information similarly, also with respect to the consumption of virtual currency, possible is such a control that the verification is acquired only at time of use of a specific service or a specific terminal apparatus. Further, in a case where a period of validity is set with respect to the consumption of virtual currency, the consumption period of virtual currency associated with a provisionally registered user ID may be set to be shorter than the consumption period of virtual currency associated with a veritably registered user ID.

In the above embodiment, a game system is exemplified as one example of network systems. It is possible to apply the present invention to various kinds of systems where a terminal apparatus other than a game machine is connected to a server apparatus via the network, and a counter value of a service served to a user via the terminal apparatus can be paid by consumption of electronic value.

A computer program according to the present invention may be served as a storage medium storing the computer program. When using such a storage medium, for example, by installing into a computer the computer program according to the present invention and making the computer execute the computer program, it is possible to realize the game system of the present invention by using the computer. The storage medium storing the computer program may be a non-transitory one such as a CD-ROM.

DESCRIPTION OF REFERENCE SYMBOLS

1 a game system (a network system)
2 a center server (a server apparatus)
3 a game machine (a terminal apparatus for business)
4 a user terminal apparatus
5 a network
7 a charge machine (a terminal apparatus for addition)
8 a card (a medium)
21 a card managing portion (a first service serving device)
22 a Web server portion (a second service serving device)
23 a user managing portion (a second service serving device, an identification information linking device, a correlation determining device, an identification information generating device, a registration switching device)
24 a charge managing portion (a value managing device, a promoting device)
25 a balance managing portion (a value managing device)
D11 data of card information
D12 game-play data
D21 data of user information
D22 data of link information
D23 data of usage setting information
D24 data of provisional registration information
D41 data of balance information

The invention claimed is:

1. A network system comprising:
a server apparatus; and
a plurality of terminal apparatuses connected with the server apparatus via a network, the plurality of terminal apparatuses including:
a business terminal apparatus which is available in exchange of payment of counter value by a user, and is configured to obtain from the user and serve to the server apparatus a first verification information including a first identification information set to a physical card medium owned by the user uniquely for each physical card medium, the business terminal apparatus including a first card reader configured to obtain the first identification information from the physical card medium;
a user terminal apparatus which is provided for personal use of the user, and is configured to obtain from the user and serve to the server apparatus a second verification information including a second identification information and at least a part of personal information of the user, the second identification information being set uniquely for each user and associated with the personal information of the user; and a terminal apparatus for addition which increases an amount of electronic value of the user, and includes a second card reader configured to obtain the second identification information from the physical card medium;

wherein the server apparatus is provided with a storage device which stores data of the first verification information and data of the second verification information, and has:

a computer apparatus that obtains the first verification information from the business terminal apparatus, checks the obtained first verification information against the stored data of the first verification information, and serves to the user via the business terminal apparatus a first service based on data associated with the first identification information on condition that the physical card medium is verified;

the computer apparatus obtains the second verification information from the user terminal apparatus, checks the obtained second verification information against the stored data of the second verification information, and serves to the user via the user terminal apparatus a second service based on data associated with the second identification information on condition that the user is verified;

the computer apparatus links the first identification information and the second identification information with each other based on a requirement from the user via the terminal apparatus;

and wherein the computer apparatus is programmed to:

receive the first identification information from the terminal apparatus for addition;

determine whether the received first identification information is linked with a corresponding second identification information in the stored data of the second verification information; and upon determining that the received first identification information is not linked with the corresponding second identification information in the stored data of the second verification information: automatically generate a provisional second identification information which is not associated with the personal information;

generate an information to be included in the second verification information as the part of the personal information together with the provisional second identification information so as to be kept hidden to the user by not noticing the information to the user;

store the information in the data of the second verification information in the storage device;

link the provisional second identification information and the received first identification information with each other, and associate the electronic value with the provisional second identification information to enable the first identification information to be used in providing the first service to the user via the business terminal apparatus;

wherein the computer apparatus serves to the user the second service via the user terminal apparatus on condition that the user is verified by checking the obtained second verification information against the stored data of the second verification information, and the computer apparatus checks the first verification information obtained via the terminal apparatus for addition in order to verify the physical card medium.

2. The network system according to claim 1, wherein the computer apparatus stores the amount of electronic value in association with the second identification information, the amount of electronic value being consumed as counter value of either the first service or the second service, and increases the amount of electronic value associated with the second identification information depending on a purchase amount of the user, in response to a purchase requirement from the terminal apparatus, the purchase requirement designating the second identification information or the first identification information being linked with the second identification information, while decreasing the amount of electronic value associated with the second identification information depending on the counter value to be consumed by the user, in response to a consumption requirement from the terminal apparatus, the consumption requirement designating the second identification information or the first identification information being linked with the second identification information, and the computer apparatus determines, in a case where use of electronic value is required with designation of the first identification information, where the second identification information linked with the first identification information exists or not.

3. The network system according to claim 2, wherein the computer apparatus obtains, in a case where a registration of the personal information is required from the terminal apparatus with designation of the first identification information, the personal information of the user corresponding to the provisional second identification information from the terminal apparatus, and stores the personal information in association with the provisional second identification information, so that the provisional second identification information is switched to the second identification information associated with the personal information of the user.

4. The network system according to claim 3, wherein the second identification information is kept hidden to the user as long as processing by the computer apparatus does not proceed to a predetermined step.

5. The network system according to claim 4, wherein the computer apparatus notices information for promotion of registration of the personal information via the terminal apparatus to the user corresponding to the provisional second identification information.

6. The network system according to claim 2, wherein a predetermined restriction is set, with respect to use of the electronic value with designation of the first identification information linked with the provisional second identification information, in comparison with use of electronic value with designation of the second identification information associated with the personal information or the first identification information linked with the second identification information.

7. The network system according to claim 6, wherein the predetermined restriction is set in association with an addition requirement of the electronic value from the terminal apparatus with designating the first identification information linked with the provisional second identification information.

8. The network system according to claim 7, wherein the terminal apparatus for addition is configured to transmit to the server apparatus on condition of payment of purchase charge by the user, the addition requirement of electronic value corresponding to a purchase amount depending on amount paid by the user with designating the first identification information obtained from the user, and the predetermined restriction is set so that the addition of electric value is enabled only when the user uses the terminal apparatus for addition to pay the purchase charge.

9. The network system according to claim 7, wherein the predetermined limitation is set so that the addition of the electronic value is enabled only when the purchase charge is paid by cash.

10. The network system according to claim 6, wherein the predetermined restriction is set so that an upper limit of electronic value which allows addition by an addition requirement designating the first identification information associated with the provisional second identification information is smaller than an upper limit of electronic value which allows addition by an addition requirement of electronic value designating the second identification information associated with the personal information or the first identification information linked with the second identification information.

11. The network system according to claim 6, wherein the predetermined restriction is set in association with a consumption requirement of the electronic value with designation of the first identification information linked with the provisional second identification information.

12. The network system according to claim 11, wherein the predetermined restriction is set so that processing for decreasing an amount of the electronic vale in response to the consumption requirement designating the first identification information is executed only when the user uses the first service via a specific terminal apparatus.

13. The network system according to claim 2, wherein the business terminal apparatus allows the user, on condition of payment of the counter value of the first service, to use the first service within a range corresponding to the counter value, and the computer apparatus serves as the first service a service that data associated with the first identification information is served to the business terminal apparatus, and also data updated depending on use of the business terminal apparatus is stored in association with the first identification information.

14. The network system according to claim 13, wherein a game machine for business is provided as the business terminal apparatus, and the computer apparatus serves to the game machine for business, game-play data where a game-play content performed by the user at the game machine for business is stored, as the data associated with the first identification information.

15. The network system according to claim 14, wherein the computer apparatus serves as the second service to the user via the user terminal apparatus, a service associated with a game which is played at the game machine for business.

16. A server apparatus being connected to a plurality of terminal apparatuses via a network, the plurality of terminal apparatuses including: a business terminal apparatus which is available in exchange of payment of counter value by a user, and is configured to obtain from the user and serve to the server apparatus a first verification information including a first identification information set to a physical card medium owned by the user uniquely for each physical card medium, the business terminal apparatus including a first card reader configured to obtain the first identification information from the physical card medium; a user terminal apparatus which is provided for personal use of the user, and is configured to obtain from the user and serve to the server apparatus a second verification information including a second identification information and at least a part of personal information of the user, the second identification information being set uniquely for each user and associated with the personal information of the user; and a terminal apparatus for addition which increases an amount of electronic value of the user, and includes a second card reader configured to obtain the second identification information from the physical card medium, wherein the server apparatus is provided with a storage device which stores data of the first verification information and data of the second verification information, and has:

a computer apparatus that obtains the first verification information from the business terminal apparatus, checks the obtained first verification information against the stored date of the first verification information, and serves to the user via the business terminal apparatus a first service based on data associated with the first identification information on condition that the physical card medium is verified;

the computer apparatus obtains the second verification information from the user terminal apparatus, checks the obtained second verification information against the stored data of the second verification information, and servers to the user via the user terminal apparatus a second service based on data associated with the second identification information on condition that the user is verified;

the computer apparatus links the first identification information and the second identification information with each other based on a requirement from the user via the terminal apparatus;

and the computer apparatus is programmed to:

receive the first identification information from the terminal apparatus for addition;

determine whether the received first identification information is linked with a corresponding second identification information in the stored data of the second verification information; and upon determining that the received first identification information is not linked with the corresponding second identification information in the stored data of the second verification information:

automatically generate a provisional second identification information which is not associated with the personal information;

generate an information to be included in the second verification information as the part of the personal information together with the provisional second identification information so as to be kept hidden to the user by not noticing the information to the user;

store the information in the data of the second verification information in the storage device;

link the provisional second identification information and the received first identification information with each other, and associate the electronic value with the provisional second identification information to enable the first identification information to be used in providing the first service to the user via the business terminal apparatus;

wherein the computer apparatus serves to the user the second service via the user terminal apparatus on condition that the user is verified by checking the obtained second verification information against the stored data of the second verification information, and the computer apparatus checks the first verification information obtained via the terminal apparatus for addition in order to verify the physical card medium.

17. A server apparatus control method being applied to a server apparatus connected to a plurality of terminal apparatuses via a network, the plurality of terminal apparatuses including: a business terminal apparatus which is available in exchange of payment of counter value by a user, and is configured to obtain from the user and serve to the server apparatus a first verification information including a first identification information set to a physical card medium owned by the user uniquely for each physical card medium, the business terminal apparatus including a first card reader configured to obtain the first identification information from the physical card medium; a user terminal apparatus which is provided for personal use of the user, and is configured to obtain from the user and serve to the server apparatus a second verification information including a second identification information and at least a part of personal information of the user; and a terminal apparatus for addition which increases an amount of electronic value of the user, and includes a second card reader configured to obtain the second identification information from the physical card medium, the second identification information being set uniquely for each user and associated with the personal information of the user, and the server apparatus provided with a storage device which stores data of the first verification information and data of the second verification information, and having:
- a computer apparatus that obtains the first verification information from the business terminal apparatus, checks the obtained first verification information against the stored data of the first verification information, and serves to the user via the business terminal apparatus a first service based on data associated with the first identification information on condition that the physical card medium is verified;
- the computer apparatus obtains the second verification information from the user terminal apparatus, checks the obtained second verification information against the stored date of the second verification information, and serves to the user via the user terminal apparatus a second service based on data associated with the second identification information on condition that the user is verified;
- the computer apparatus links the first identification information and the second identification information with each other based on a requirement from the user via the terminal apparatus; and wherein the server apparatus control method includes the computer apparatus performing the steps of:
- receiving the first identification information from the terminal apparatus for addition;
- determining whether the received first identification information is linked with a corresponding second identification information in the stored data of the second verification information; and
- upon determining that the received first identification information is not linked with the corresponding second identification information in the stored data of the second verification information:
- automatically generating a provisional second identification information which is not associated with the personal information;
- generating an information to be included in the second verification information as the part of the personal information together with the provisional second identification information so as to be kept hidden to the user by not noticing the information to the user;
- storing the information in the data of the second verification information in the storage device;
- linking the provisional second identification information and the received first identification information with each other and;
- associating the electronic value with the provisional second identification information to enable the first identification information to be used in providing the first service to the user via the business terminal apparatus;
- wherein the computer apparatus serves to the user the second service via the user terminal apparatus on condition that the user is verified by checking the obtained second verification information against the stored data of the second verification information, and the computer apparatus checks the first verification information obtained via the terminal apparatus for addition in order to verify the physical card medium.

18. A non-transitory computer readable storage medium storing a computer program of a server apparatus having a computer apparatus, the server apparatus being connected to a plurality of terminal apparatuses via a network, the plurality of terminal apparatuses including: a business terminal apparatus which is available in exchange of payment of counter value by a user, and is configured to obtain from the user and serve to the server apparatus a first verification information including a first identification information set to a physical card medium owned by the user uniquely for each physical card medium, the business terminal apparatus including a first card reader configured to obtain the first identification information from the physical card medium; a user terminal apparatus which is provided for personal use of the user, and is configured to obtain from the user and serve to the server apparatus a second verification information including a second identification information and at least a part of personal information of the user, the second identification information being set uniquely for each user and associated with the personal information of the user; and a terminal apparatus for addition which increases an amount of electronic value of the user, and includes a second card reader configured to obtain the second identification information from the physical card medium, wherein
- the server apparatus is provided with a storage device which stores data of the first verification information and data of the second verification information, and the computer program causes the computer apparatus:
- to obtain the first verification information from the business terminal apparatus, to check the obtained first verification information against the stored data of the first verification information, and to serve to the user via the business terminal apparatus a first service based on data associated with the first identification information on condition that the physical medium is verified;
- to obtain the second verification information from the user terminal apparatus, to check the obtained second verification information against the stored data of the second verification information, and to serve to the user via the user terminal apparatus a second service based on data associated with the second identification information on condition that the user is verified;

to link the first identification information and the second identification information with each other based on a requirement from the user via the terminal apparatus;

to receive the first identification information from the terminal apparatus for addition;

to determine whether the received first identification information is linked with a corresponding second identification information in the stored data of the second verification information; and upon determining that the received first identification information is not linked with the corresponding second identification information in the stored data of the second verification information:

to automatically generate a provisional second identification information which is not associated with the personal information;

to generate an information to be included in the second verification information as the part of the personal information together with the provisional second identification information so as to be kept hidden to the user by not noticing the information to the user;

to store the information in the data of the second verification information in the storage device;

to link the provisional second identification information and the received first identification information with each other, and to associate the electronic value with the provisional second identification information to enable the first identification information to be used in providing the first service to the user via the business terminal apparatus;

wherein the computer apparatus serves to the user the second service via the user terminal apparatus on condition that the user is verified by checking the obtained second verification information against the stored data of the second verification information, and the computer apparatus checks the first verification information obtained via the terminal apparatus for addition in order to verify the physical card medium.

* * * * *